Oct. 27, 1953

D. F. HOTH ET AL 2,657,266

AUTOMATIC MULTICHANNEL SELECTION

Filed Nov. 4, 1950

INVENTORS: D. F. HOTH
R. O. SOFFEL
BY
H. A. Burgess
ATTORNEY

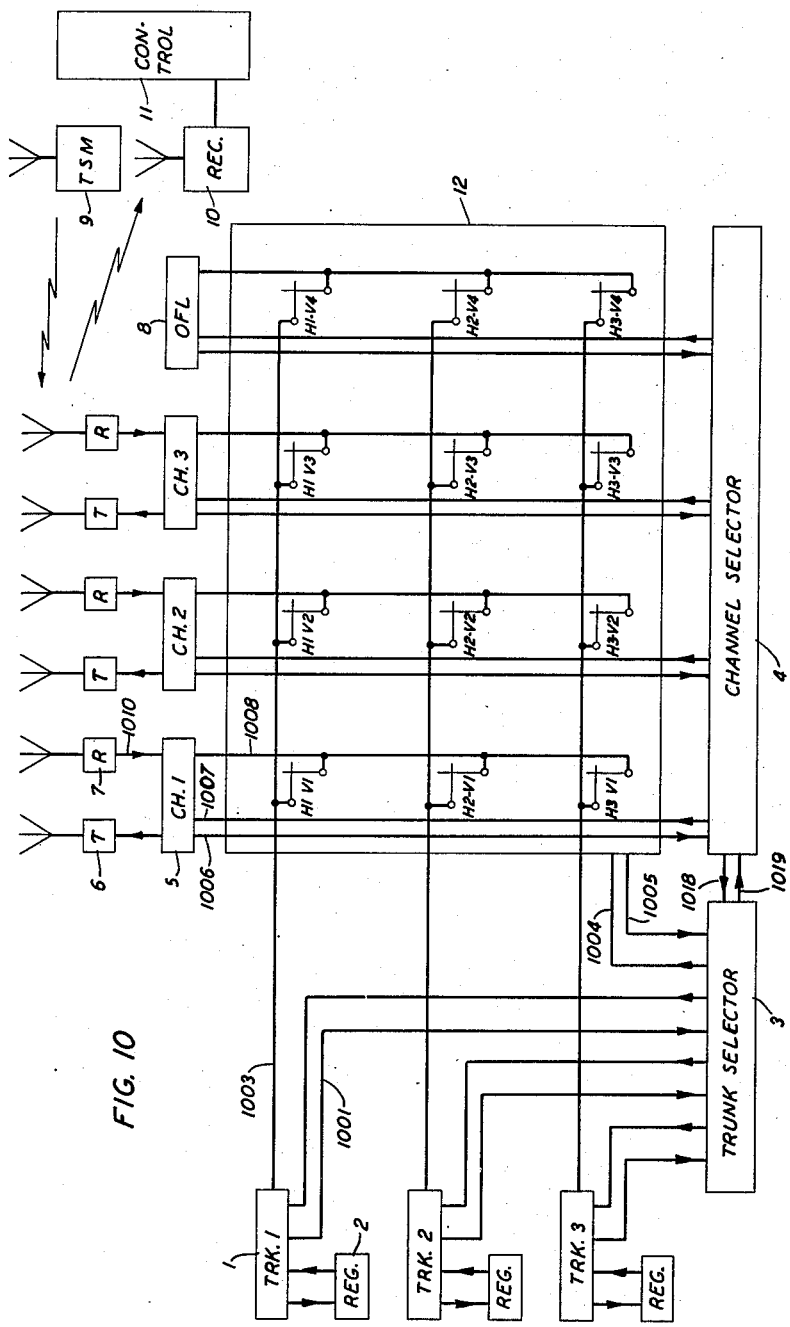
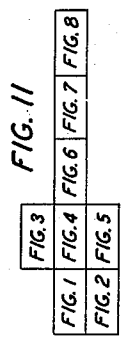
FIG. 10
FIG. 11
INVENTORS: D. F. HOTH
R. O. SOFFEL
BY
ATTORNEY Patented Oct. 27, 1953

2,657,266

UNITED STATES PATENT OFFICE 2,657,266

AUTOMATIC MULTICHANNEL SELECTION

Daniel F. Hoth, Millburn, N. J., and Robert O. Soffel, Hastings-on-Hudson, N. Y., assignors to Bell Telephone Laboratories, Incorporated, New York, N. Y., a corporation of New York Application November 4, 1950, Serial No. 194,162

3 Claims. (Cl. 179—2.5)

This invention relates to telephone systems and especially to a multichannel common medium transmission system between a central or base station and a plurality of outlying stations.

An object of the invention is to enable any one of a large number of outlying stations to be selectively signaled from a central calling station and be directed to connect itself to a particular one of a plurality of transmission channels, and to deny all other stations access to this channel.

Another object of the invention is to enable any one of a large number of outlying stations to establish a connection to the base station over any idle one of a plurality of transmission channels, and to cause all other stations to be denied access to this channel.

Although this invention may be employed in other communication or signaling systems, the embodiment in which it is here described is a multichannel mobile radio telephone system. As specifically applied to such a system, one of the objects is to provide a greatly improved grade of service to mobile radio subscribers. Heretofore, mobile radio systems have operated on the same principle as a conventional party line telephone system except that the number of subscribers in a mobile radio telephone system greatly exceeds the number of parties that would ordinarily be put on one conventional telephone line. By providing each mobile radio telephone subscriber with access to a plurality of signaling channels, the grade of service thus obtained is much better than that which would be obtained by dividing the number of mobile subscribers in smaller groups and assigning each group to one channel only. Furthermore, a larger number of mobile subscribers can be accommodated by a multichannel system where all mobile subscribers have access to all channels than by a system having several exclusive channels.

Another object of the invention is to provide privacy for the mobile subscribers by denying access of other subscribers to busy channels.

In this specification a transmission channel will be understood to comprise two carrier frequencies, one for transmission in one direction and the other for transmission in the opposite direction. At the base station a separate fixed-tuned transmitter and receiver are provided for each channel. Each mobile station is provided with a tunable transmitter and receiver.

In the system according to this invention the base station transmits over some one of the channels that happen to be idle a modulation of distinctive frequency, hereinafter called the idle tone. Each mobile receiver is equipped with a hunting device which causes the receiver, in the standby condition, to be tuned to the frequency of the channel carrying idle tone. Should this channel become busy, idle tone is removed and transferred to the next succeeding idle channel, causing all idle mobile stations to be tuned to the new channel.

Although for the purpose of the invention any system of selective signaling may be employed, the method herein described consists of the simultaneous transmission of a combination of four audio frequencies, each mobile station being assigned an exclusive combination, as described in the copending applications of H. C. Harrison, Serial No. 767,487, filed August 8, 1947, and D. F. Hoth-R. O. Soffel, No. 56,186, filed October 23, 1948.

The invention will be better understood from the following detailed description together with the accompanying drawings, in which:

Fig. 10 is a block diagram for the entire system; and

Fig. 11 shows the order in which the preceding Figs. 1 to 8 are to be read.

Figure 1:
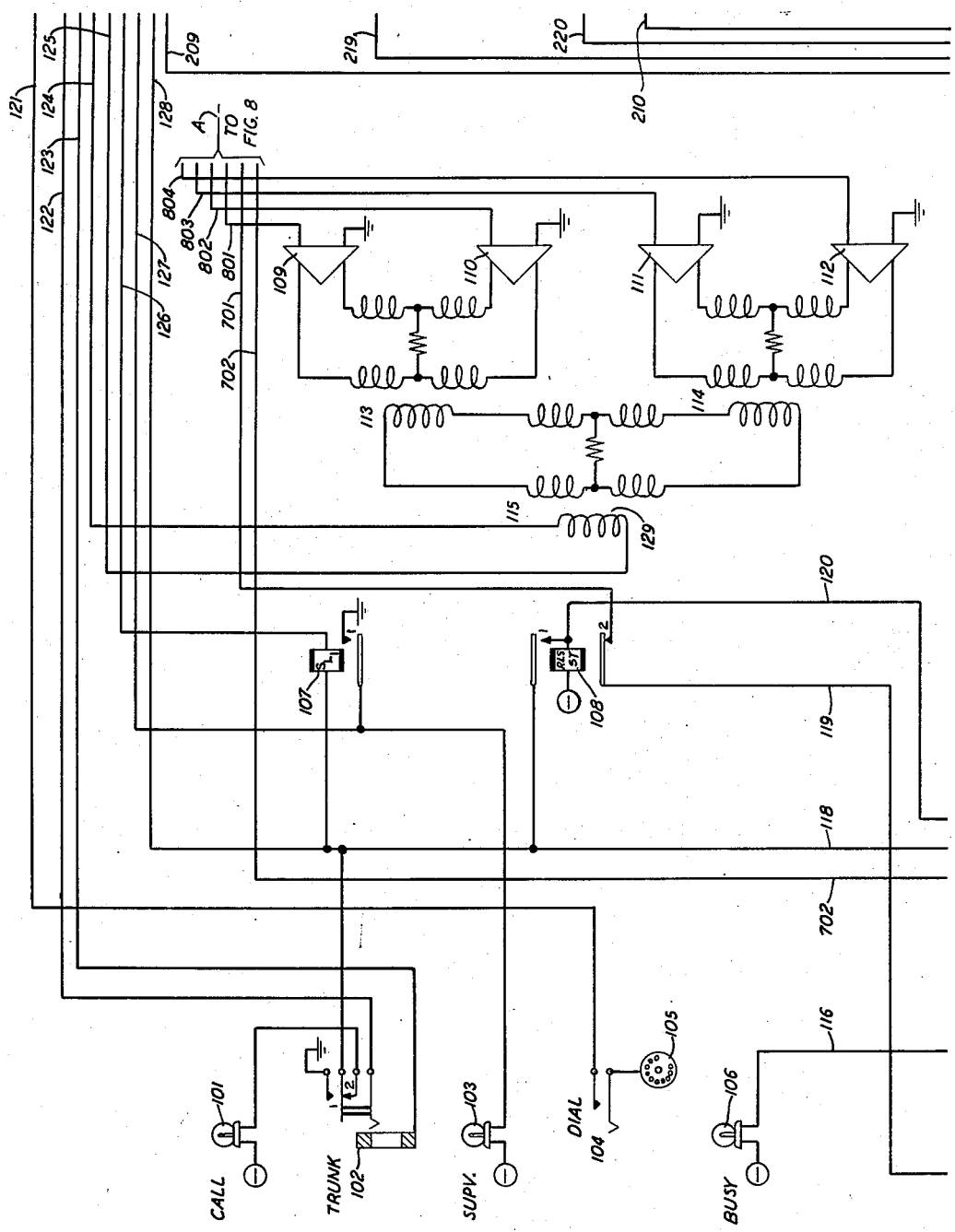
Fig. 1 represents a trunk circuit at the base station.

The general operation of the invention will first be explained in terms of the block diagram shown in Fig. 10. Referring to this figure, a call originating from the base station will first be described. For the purpose of this description it will be assumed that no channels are busy and that channel 1 is designated the idle channel, that is, the channel which is carrying idle tone. When an operator desires to originate a call, she inserts the plug of a cord circuit into a jack in the trunk circuit shown as block 1. By means of a dial or any of the other well-known methods, the operator causes the number of the wanted station to be registered in the register represented by block 2. When the complete number has been registered, the trunk transmits a signal over lead 1001 to the trunk selector, shown as block 3. The trunk selector operates the select magnet corresponding to trunk 1, on the crossbar switch represented by block 12, over lead 1004. When the select magnet has operated, it returns a signal over lead 1005 to the trunk selector which then causes the channel selector shown in block 4 to operate the vertical hold magnet corresponding to the idle channel, in this case channel 1, over lead 1019. The operation of the hold magnet causes a group of contacts, in this case those designated H1—V1, to close and thereby provide a transmission path from the trunk 1 circuit represented by block 1 over lead group 1003, through the operated switch contacts to the channel 1 circuit represented by block 5 over lead group 1006. Previous to the operation of the hold magnet, a circuit was closed over lead 1007 to remove the idle tone from the channel 1 transmitter represented by block 6. After the connection has been established between trunk 1 and channel 1, the combination of four frequencies is transmitted from the register 2, through the trunk 1, and through the crossbar switch 12 to the transmitter 6 for channel 1.

The hunting mechanism in the mobile receiver is slow to start in order not to allow the receiver to become tuned to another channel during the interval between the removal of idle tone and the application of the signaling tones at the base station. The mobile receiver which is being signaled, represented by block 10, becomes locked to channel 1 by means of the control circuit 11, first by the ringing tones and then by switchhook contacts when the mobile subscriber answers. At the end of the above-mentioned interval all other mobile receivers remove themselves from this channel and hunt for the new idle channel. When the connection is established between trunk 1 and channel 1, a circuit is enabled in the channel selector 4 to select the next succeeding idle channel, in this case channel 2, and cause it to radiate idle tone. When the connection thus established is terminated, channel 1 again becomes idle, but channel 2 remains the designated idle channel.

When a mobile station originates a call, the reception of carrier from its transmitter 9 by the fixed station receiver 7 causes the latter's codan to operate, which immediately causes idle tone to be removed from that channel. A signal is then sent over lead 1010 through the channel 1 circuit represented by block 5 to the channel selector 4 over lead 1006, indicating that a mobile station is originating a call. The channel selector signals the trunk selector 3 over lead 1018 to select an idle trunk. The trunk selector then operates a horizontal select magnet corresponding to the idle trunk selected and signals the channel selector over lead 1019 that this has been done. The channel selector then operates the vertical hold magnet associated with the proper channel, causing a connection to be established between the channel and trunk circuits. The channel selector also selects the next succeeding idle channel and causes it to radiate idle tone.

In order to reduce the possibility of double connections which might occur during the interval from the time of removal of idle tone from a given channel (say channel 1) until the mobile receivers have recognized the absence of this tone, the base station is so arranged that after it has removed idle tone on a base station originating call it waits for a predetermined interval, designated the test interval, before setting up the connection for signaling tones. This test interval, to which references will be made hereinafter, includes the recognition time just mentioned plus the time that would be required for the base station to recognize waves starting from a mobile station just before the end of the latter's recognition time. If a mobile call should originate and be recognized at the base station during this interval, the channel in question (channel 1) is reserved for this call. However, the mobile originating call is halted temporarily and a reorder signal is sent to the channel selector. The channel selector is then caused to select a new channel (say channel 2) for the base station originating call and to establish this connection, after which the mobile originating call is allowed to proceed (over channel 1). Should the above occur when only one channel is idle, the mobile call is halted as before and the trunk over which the base station call is being attempted is connected to the overflow circuit represented by block 8. This circuit thereupon causes the operator's supervisory lamp to flash, thus indicating that there are no channels available to complete the operator's call, there being only as many trunks as channels. The operator then removes the plug of her cord circuit from the trunk circuit jack and the mobile originating call proceeds over this abandoned trunk.

A detailed description of the invention will now be presented. As shown on the attached figures, a system having three trunks and three channels will be described, in which any trunk may be connected to any channel. It will be evident to those skilled in the art that this system can readily be expanded to care for any number of trunks and channels. In order to cover all features of the system, the operation of the circuits for the following cases will be considered:

(1) An operator originates a call when no channels are busy and channel 1 is the designated idle channel, that is, the channel carrying idle tone.

(2) A mobile subscriber originates a call on channel 2, channel 1 still being busy.

(3) An operator originates a call on channel 3, but a mobile subscriber originates a call on this channel during the test interval, causing the operator to be routed to overflow. All channels are now busy, and there is no idle tone.

(4) The connection on channel 2 is disconnected, causing idle tone to be put on this channel, the other channels remaining busy.

(5) With no channels busy and channel 1 the designated idle channel, as in (1), the operator originates a call and a mobile subscriber originates a call during the test interval, causing the operator's call to be rerouted to channel 2. Channel 3 is then designated the idle channel.

(6) The call on channel 1 is disconnected.

*Channel 1 designated the idle channel when starting up*

Figure 2:
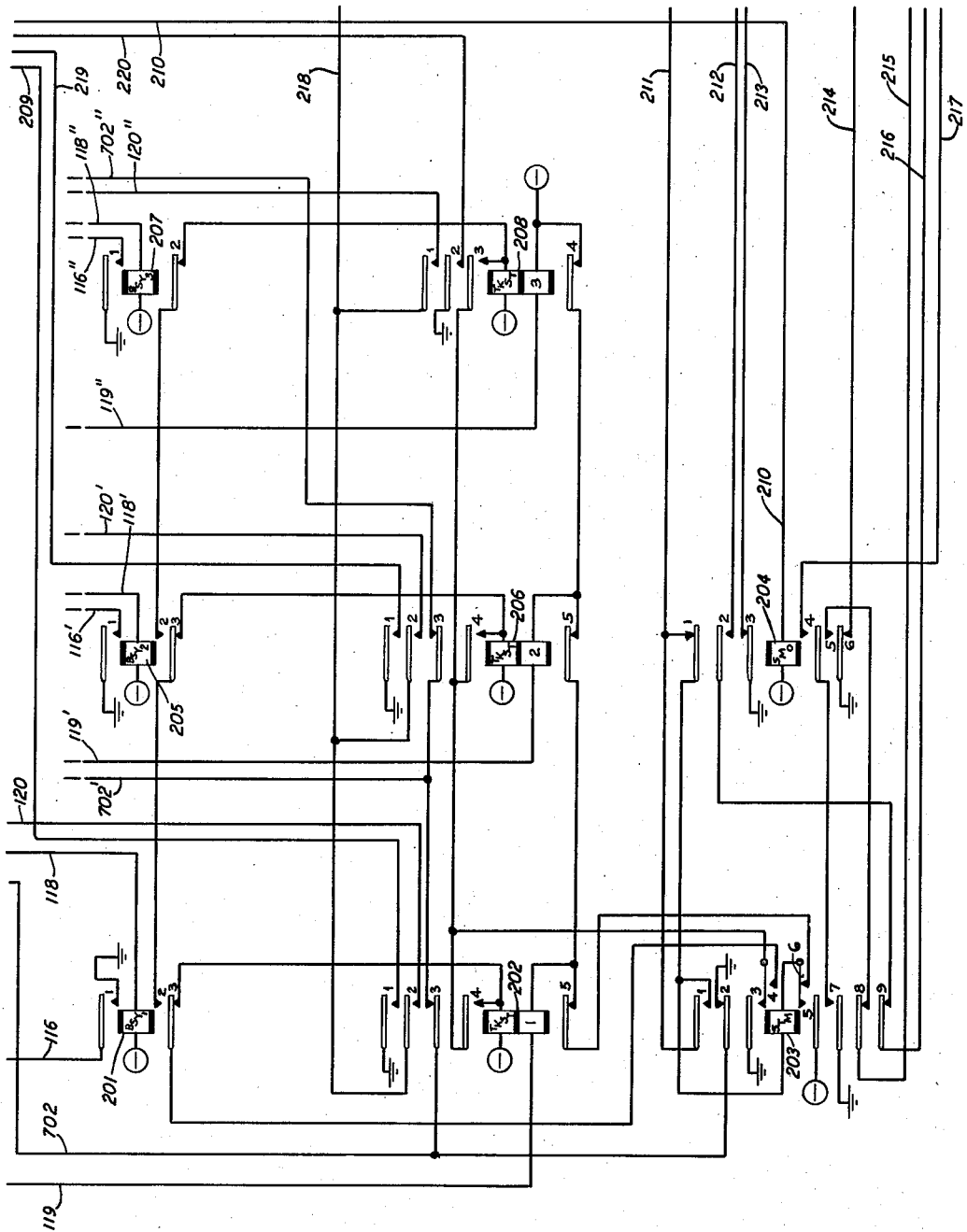
Fig. 2 shows the trunk selector circuit for the system.

When the system is first put into use, or restored to use after a shutdown, channel 1 is automatically designated the idle channel as follows. Referring to Fig. 2, ground from the armature and contact 6 of the released select-magnet-operated relay 204 is connected over lead 214 to Fig. 5, through the armature and contact 2 of the test channel relay 501, through the armature and contact 2 of each of the idle channel auxiliary relays 506, 517 and 520, through the armature and contact 6 of the all-channels-busy relay 508, through the contact 11 and armature of idle channel 3 relay 521, through the contact 12 and armature of each of the idle channel relays 513 and 507, over lead 511 to Fig. 4, through the armature and contact 4 of No. 1 hold magnet 402, over lead 512 to Fig. 5 through the armature and contact 1 of mobile start relay 505, and through the winding of idle channel auxiliary 1 relay 506 to battery, causing the latter relay to operate and lock. The operation of relay 506 connects ground from its armature and contact 4 through the upper winding of idle channel 1 relay 507 to battery, causing it to operate. The operation of relay 507 connects ground from the armature and contact 3 of the test channel relay 501, through the armature and contact 6 of relay 507, through the contact 1 and armature of relay 506, over lead 309 to Fig. 3, and through the winding of the idle tone relay 302 to battery, causing this relay to operate.

Figure 5:
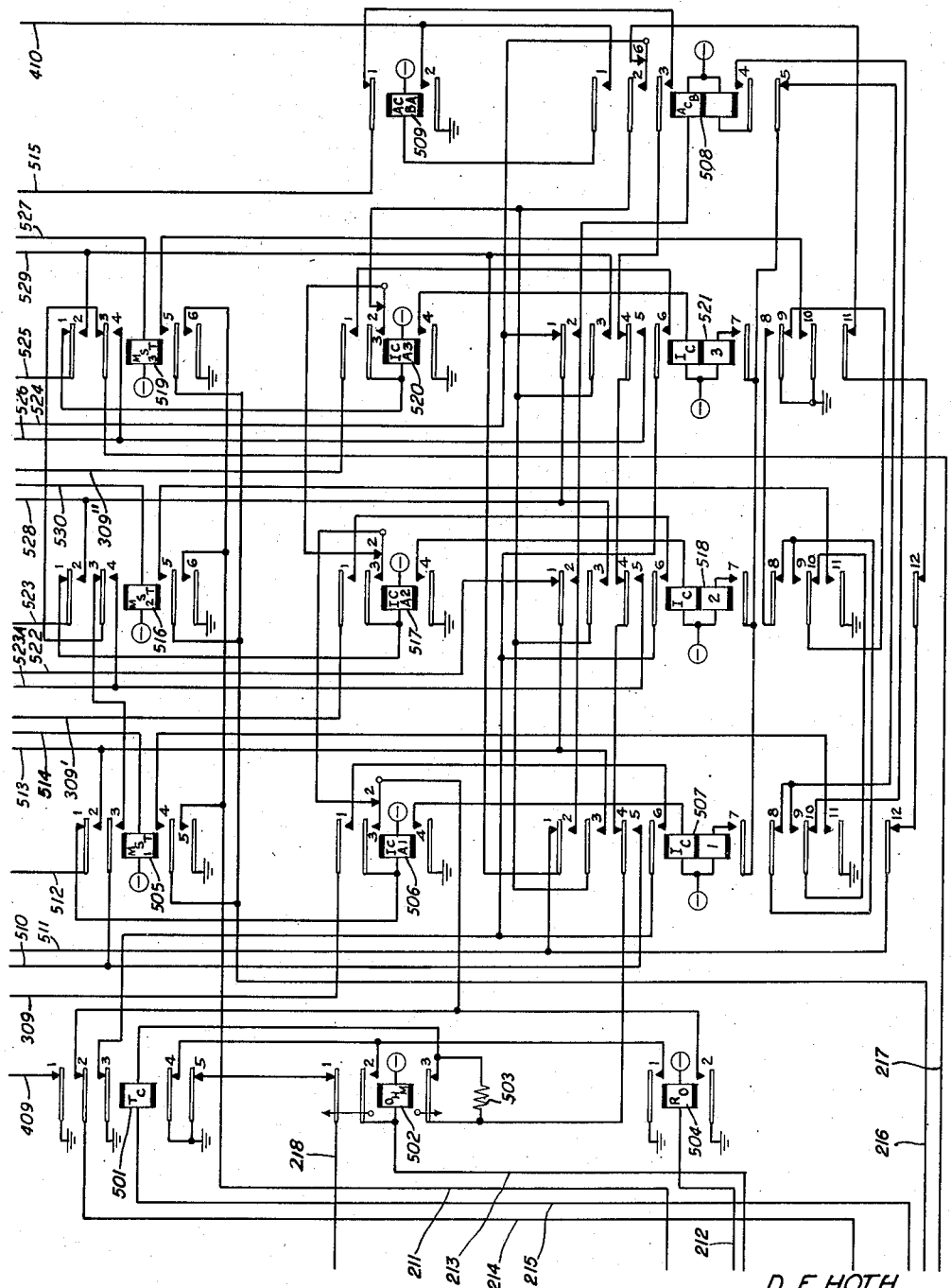
Fig. 5 shows the system of relays and circuits comprising the channel selector.

Idle tone will then be connected to transmitter 304 (Fig. 3) over the following path: from the idle tone oscillator 301, through contact 2 and the armature of the idle tone relay 302, through contact 1 and the armature of the talk relay 303 to the transmitter 304, and return through the armature and contact 4 of relay 303 and through the armature and contact 3 of relay 302 to the idle tone oscillator 301. In Fig. 5, the operate hold magnet relay 502 will be operated from ground on the armature and contact 3 of relay 204 in Fig. 2, over lead 213, and through the winding of relay 502 to battery.

*Mobile stations hunt for idle tone*

Figure 9:
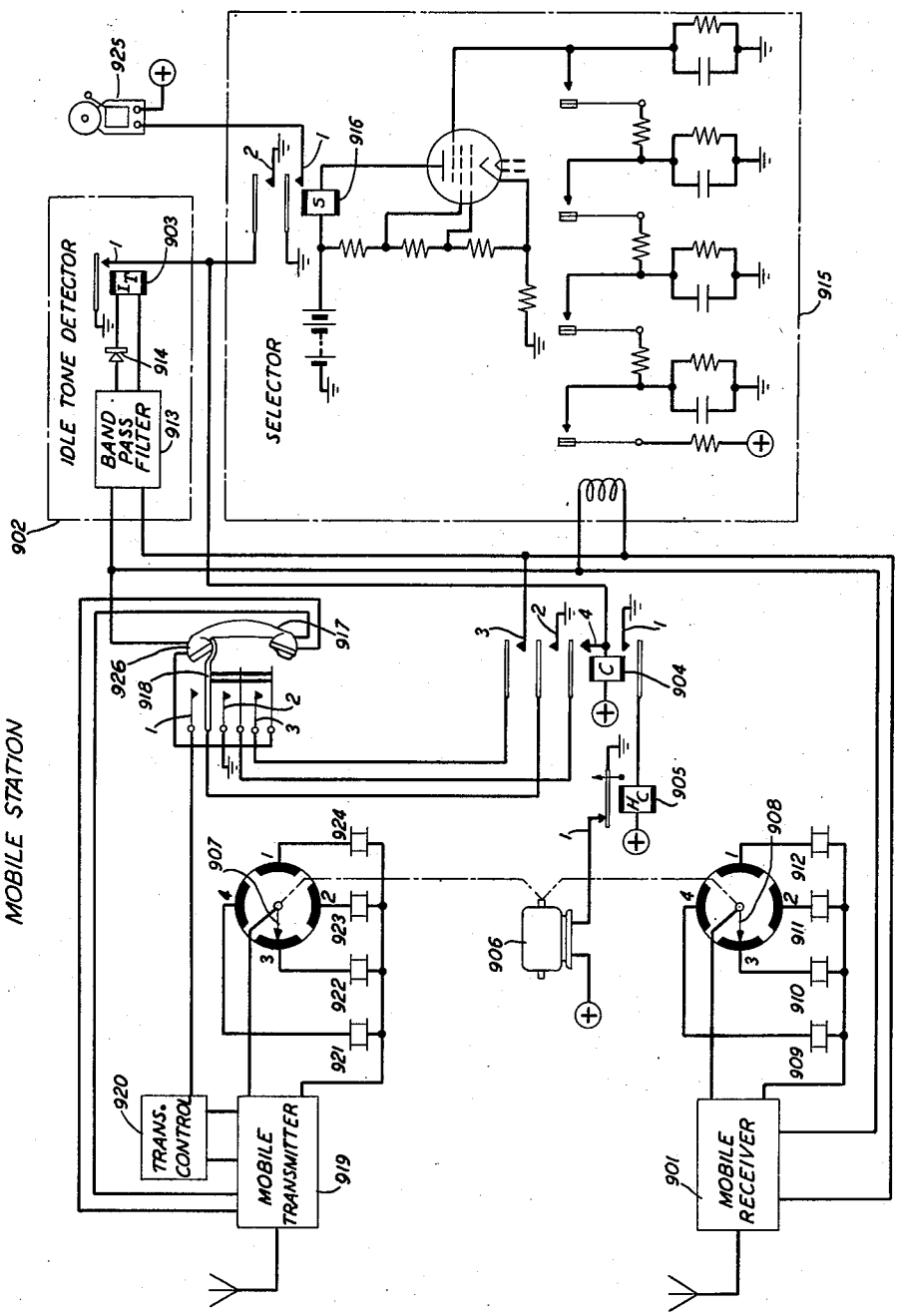
Fig. 9 represents the units of a typical mobile station.

When a mobile station is first put into operation, it hunts over each channel in turn until the channel on which idle tone is being transmitted by the base station is received. The hunting then stops and the mobile station remains tuned to this channel. This operation will now be described in detail. Referring to Fig. 9, assume that when the mobile station is put into operation it is tuned to channel 3. Assume also that idle tone is being transmitted by the base station on channel 1. The hunting control relay 905 is unoperated. A path is established from ground through the armature and contact 1 of the hunting control relay 905 to the winding of the motor 906 and thence to battery. The motor runs, driving switches 907 and 908 slowly in a clockwise direction. Switch 908 connects crystals 910, 909, etc. in turn to the mobile receiver 901. In the system being described, the mobile receiver is assumed to be of the common superheterodyne type in which the signal from a local oscillator is combined with the incoming signal to produce an intermediate frequency signal. By changing the frequency of the local oscillator the receiver can be tuned to a new channel. It is assumed that a crystal controlled local oscillator is used and that the frequency of the oscillator is changed by substituting a new crystal tuned to a different frequency. Thus, as switch 908 rotates, connecting each of the crystals in turn, the receiver is tuned to each of the channels in turn. However, any other suitable type of receiver may be used, if desired.

When the wiper of switch 908 reaches segment 1, crystal 912 is connected to the mobile receiver and channel 1 is received. Since idle tone is being transmitted by the base station on channel 1, it is received by the mobile receiver 901 and transmitted to the idle tone detector 902. In the idle tone detector the signal is transmitted through the band-pass filter 913 and the rectifier 914 to the coil of the idle tone relay 903. The rectifier converts the idle tone alternating current to a direct current which operates the idle tone relay. The operation of the idle tone relay closes a path from ground through its armature and contact 1 to the coil of the control relay 904 and thence to battery, operating the control relay. Operation of this relay closes a path from ground through its contact 1 and armature to the coil of the hunting control relay 905 and thence to battery. Operation of the hunting control relay opens the path from ground through its armature and contact 1 to the motor and thence to battery, causing the motor to stop running. The mobile receiver thereupon remains tuned to channel 1. All other mobile stations receiving idle tone will become tuned to channel 1 in the same manner.

*Base station originates a call on channel 1*

Figure 6:
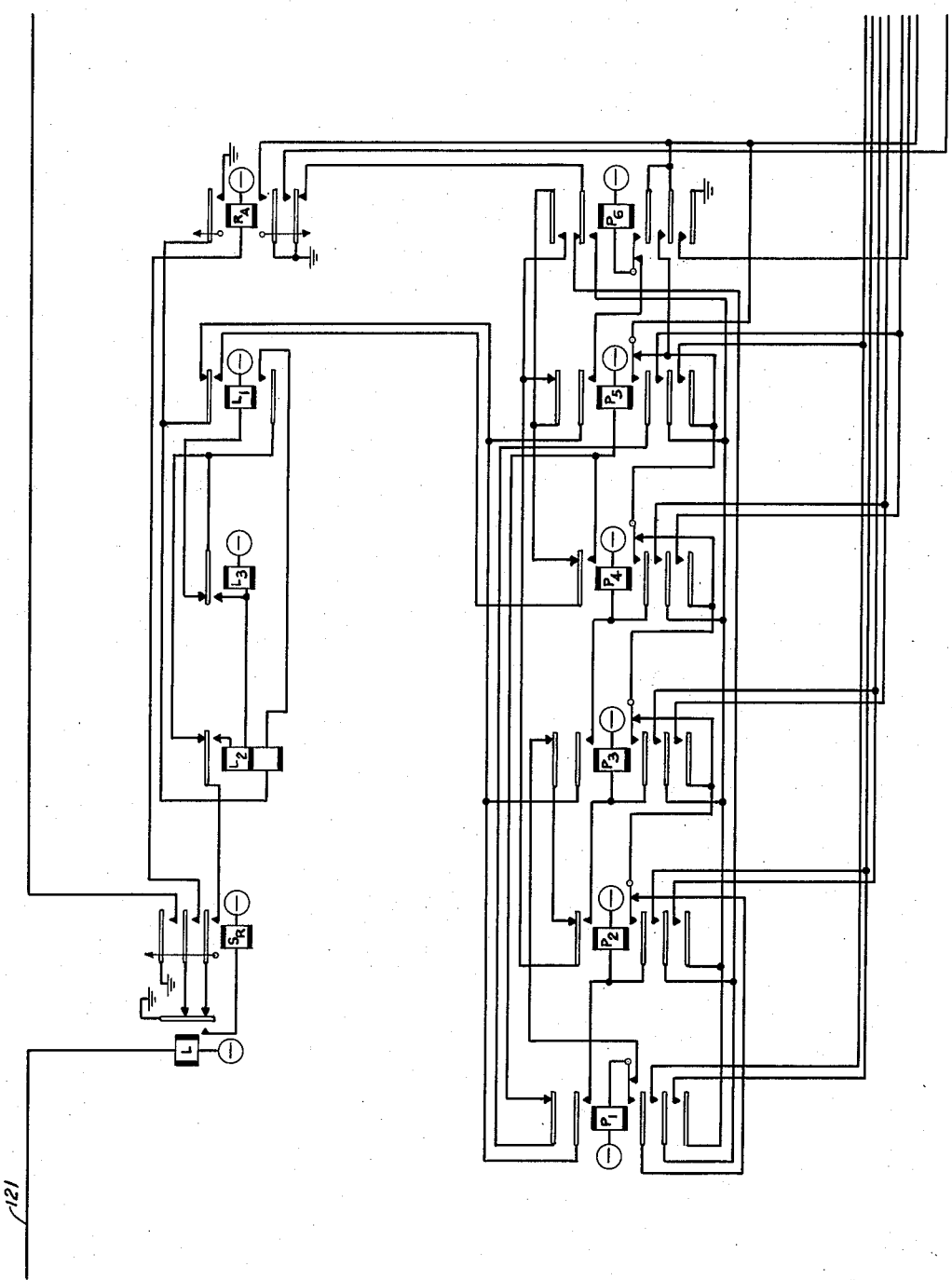
Figs. 6, 7 and 8 represent respectively a dial pulse counting circuit, a steering and lock circuit, and a register and translator circuit.
Figure 7:
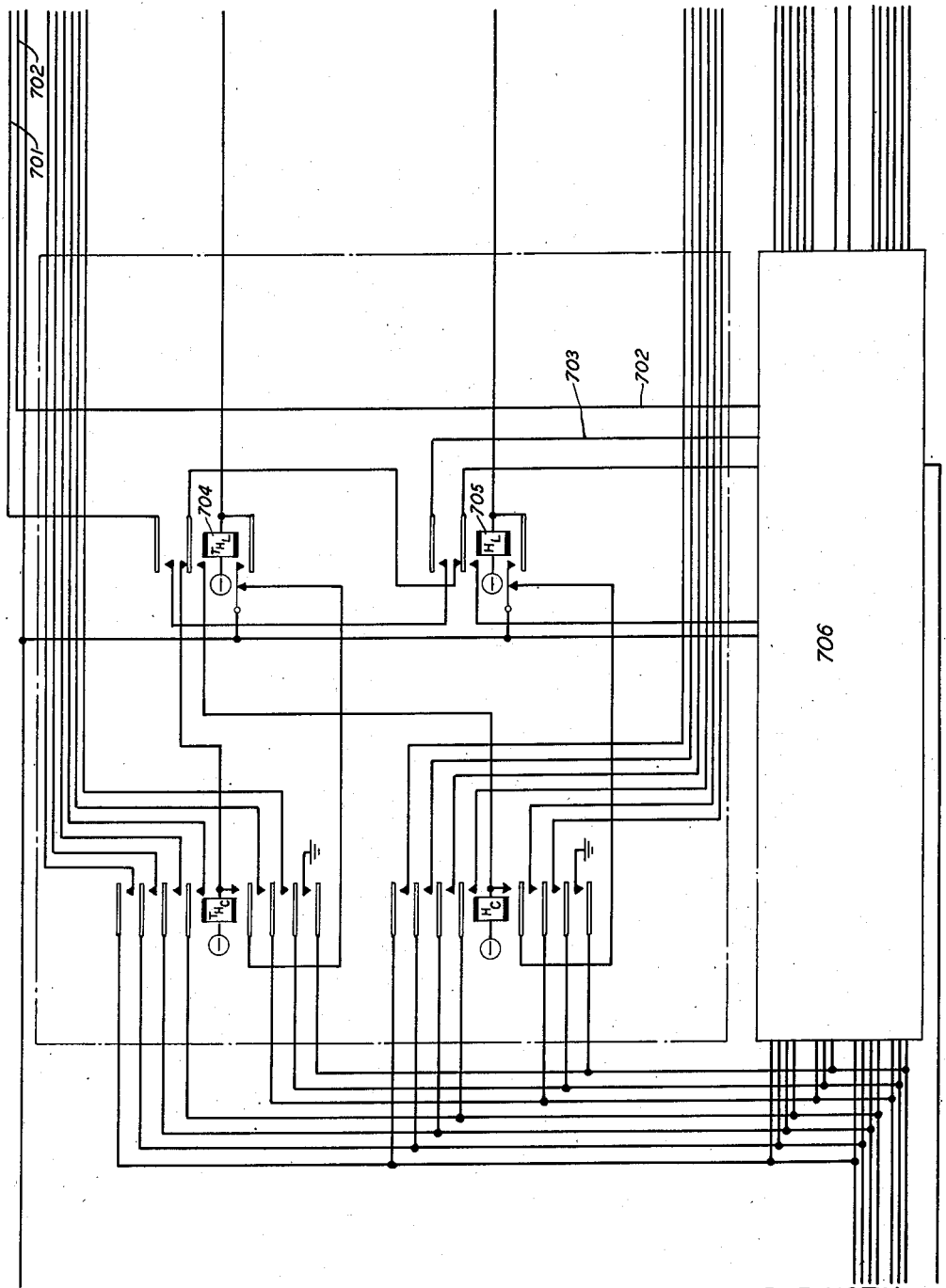
Figure 8:
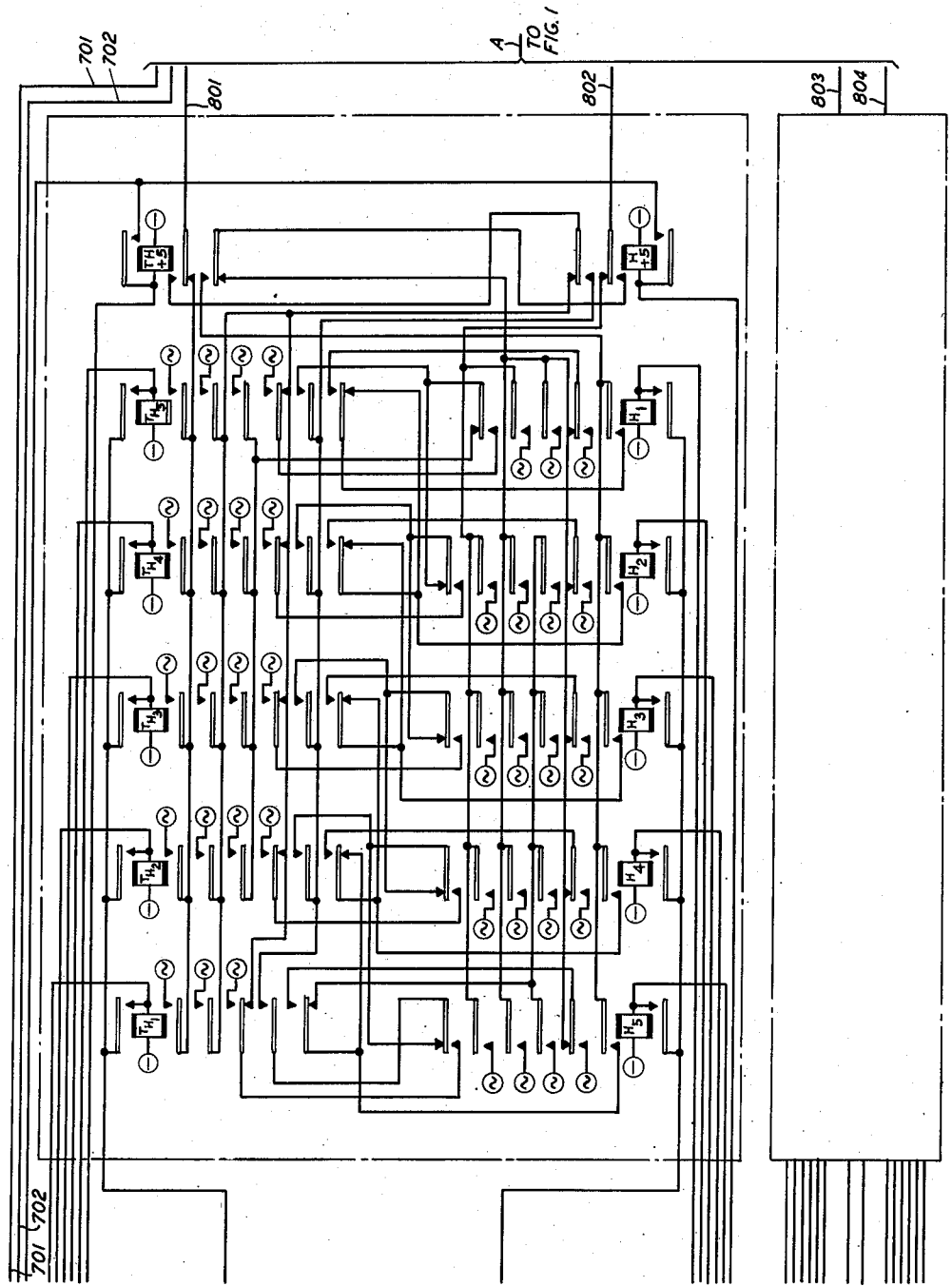

In order to originate a call the operator inserts the plug of her cord into the trunk jack 102 in Fig. 1 for trunk 1. The insertion of the plug into jack 102 connects ground from its contact 1 through its armature over lead 118 to Fig. 2, and through the winding of the busy 1 relay 201 to battery, causing this relay to operate. When relay 201 operates, ground on its contact 1 is connected through its armature over lead 116 to light the busy lamp 106 (Fig. 1). The operator then operates the dial key 104 which connects the dial 105 over lead 121 to Fig. 6. The relays shown in Fig. 6 comprise a dial pulse counting circuit, those in Fig. 7 a steering and lock circuit, and those in Fig. 8 a register and translator circuit. The operation of Figs. 6, 7 and 8 is described in detail in the aforementioned copending application of D. F. Hoth-R. O. Soffel, Serial No. 461,186, and will not be further described here.

When the operator has completed dialing four digits the trunk start 1 relay 202 (Fig. 2) is operated over the following path: from battery through contact 4 and armature of the unoperated relay 208, through contact 5 and armature of the unoperated relay 206, through the lower winding of relay 202, over lead 119 to Fig. 1, through the armature and contact 2 of the unoperated release start relay 108, over lead 701 to Fig. 8 and then to Fig. 7, through the armature and top contact of the operated thousands lock relay 704, through the top contact and armature of the operated hundreds lock relay 705, over lead 703 to block 706 which contains similar lock relays for the tens and units digits, back over lead 702 and through Figs. 8 and 1 to Fig. 2, and through the armature and contact 2 of the unoperated start mobile relay 203 to ground.

Figure 4:
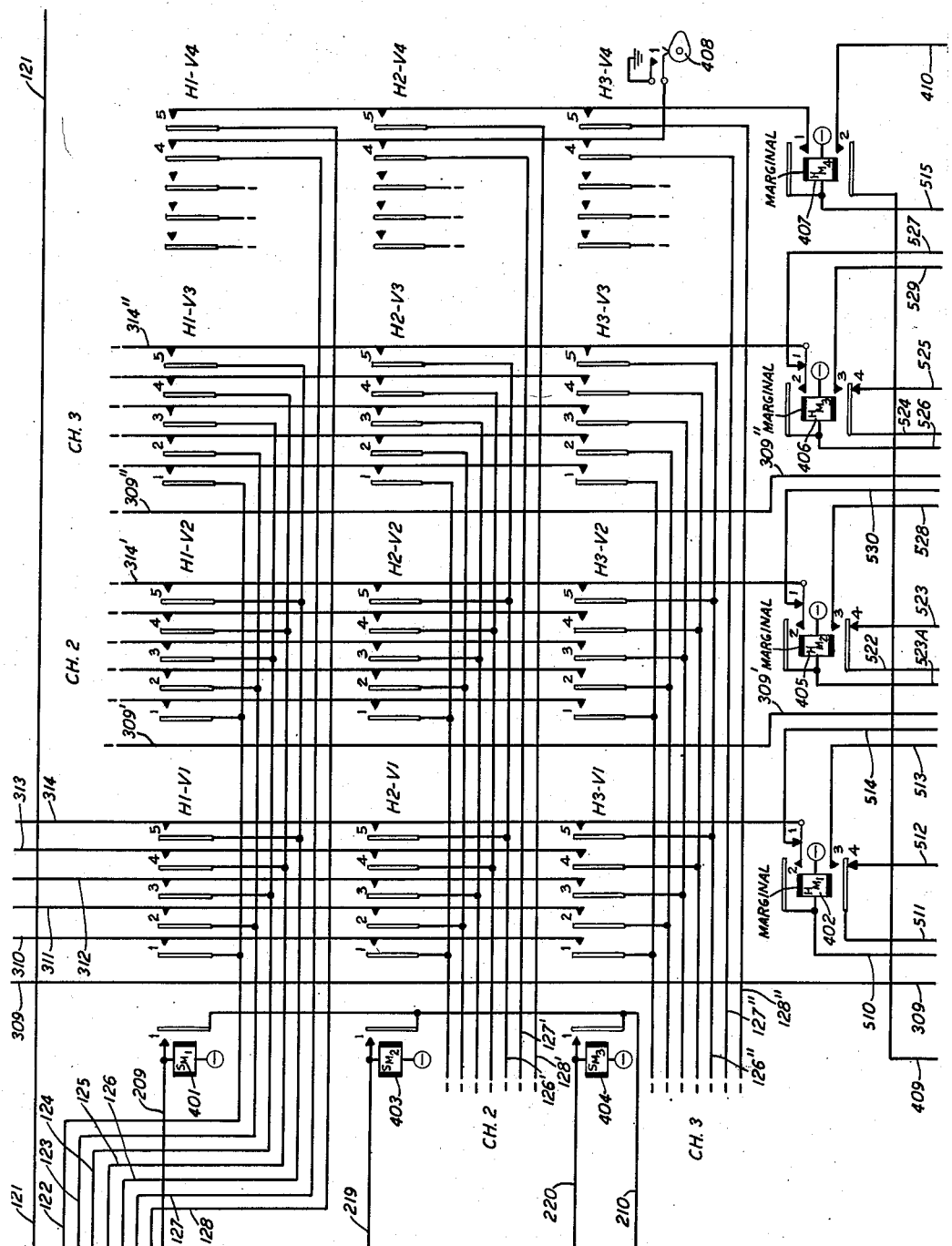
Fig. 4 shows the system of switches used in connecting a trunk circuit to any given radio channel.

The operation of relay 202 connects ground from its armature and contact 1 over lead 209 to Fig. 4, and through the winding of No. 1 select magnet 401 to battery, causing it to operate. The operation of the select magnet continues its operating ground through its contact 1 and armature over lead 210 through Fig. 1 to Fig. 2 and through the winding of the select magnet operated relay 204, causing the latter to operate. The operation of select magnet 401 prepares a mechanical path for operating one of the sets of contacts associated with this select magnet.

The operation of relay 204 releases the idle channel auxiliary relay 506 in Fig. 5, which had been held over the following path: ground through the armature and contact 6 of relay 204, over lead 214 to Fig. 5, through the armature and contact 2 of relay 501, through the armature and contact 3 of relay 506, and through its winding to battery. The operation of relay 204 operates relay 501 in Fig. 5 over the following path: ground from the armature and contact 5 of operated relay 204, through contact 8 and armature of the start mobile relay 203, over lead 215 to Fig. 5, through the winding of the test channel relay 501, through resistance 503 (since relay 502 is operated as previously described), through the armature and contact 5 of the operated idle channel 1 relay 507, over lead 510 to Fig. 4, and through the winding of No. 1 hold magnet 402 to battery. The hold magnet 402 is marginal so that it will not operate under this condition because resistance 503 (Fig. 5) limits the current. Relay 501, however, is a sensitive relay and operates on this reduced current.

Figure 3:
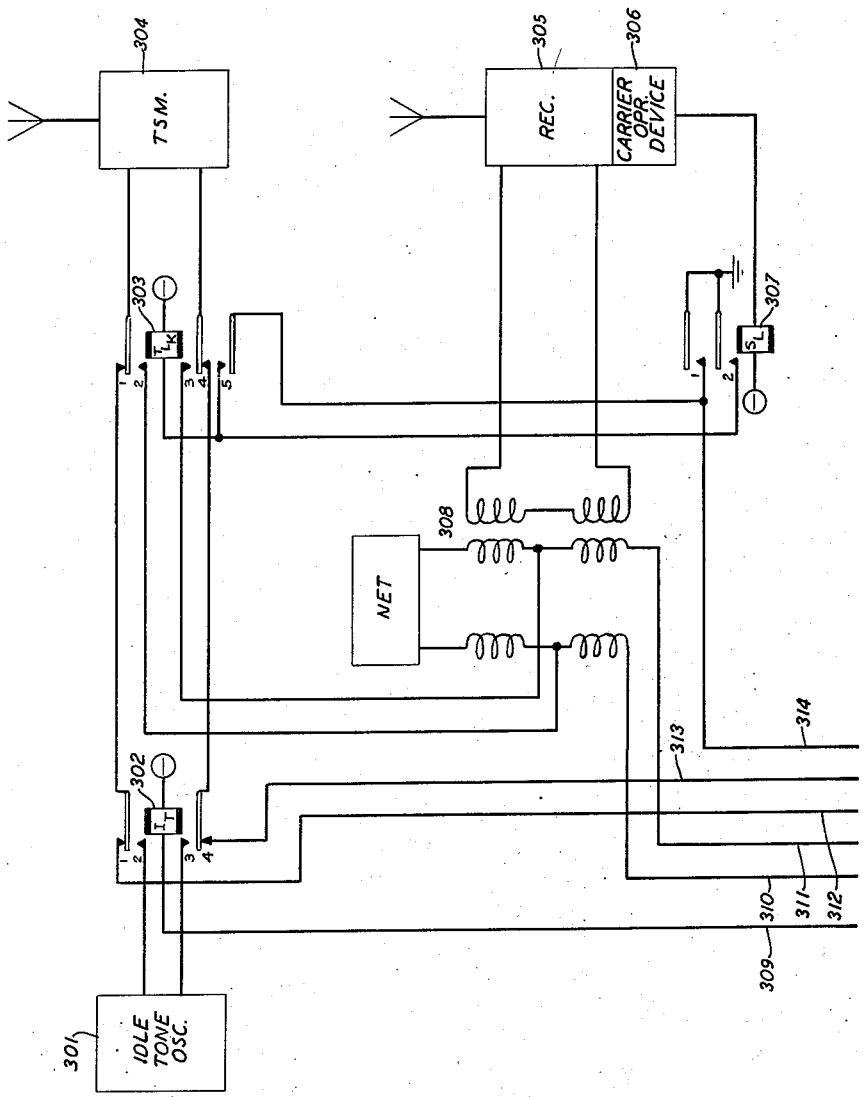
Fig. 3 shows the base station transmitter input and receiver output circuits for a single channel.

The release of the idle channel auxiliary relay 506 previously mentioned causes the release of the idle tone relay 302 in Fig. 3 which had been held over the following path: ground from the armature and contact 3 of relay 501, through the armature and contact 6 of relay 507, through contact 1 and armature of relay 506, and over lead 309 to the idle tone relay 302. The release of relay 302 opens the previously described path connecting the idle tone oscillator 301 to the transmittor 304.

When the test channel relay 501 in Fig. 5 operates, it opens the locking circuit for the operate-hold-magnet relay 502; but this relay is slow to release in order to provide the test interval previously described. When relay 502 releases it puts a short circuit across resistance 503 through its armature and contact 3. This increases the current through the winding of hold magnet 402 sufficiently to allow the latter to operate. The operation of the hold magnet causes a set of contacts in Fig. 4 designated H1—V1 to close. When these contacts close, the following path is established between the transmitter 304 in Fig. 3 and the hybrid coil 115 in Fig. 1 for the purpose of transmitting signaling tones over channel 1: from the transmitter 304, through the armature and contact 1 of the unoperated relay 303, through the armature and contact 1 of the unoperated relay 302, over lead 312 to Fig. 4, through contact 3 and armature of H1—V1, over lead 124 to Fig. 1, through winding 129 of the hybrid coil 115, over lead 125 to Fig. 4, through the armature and contact 4 of H1—V1, over lead 313 to Fig. 3, through contact 4 and armature of relay 302, and through contact 4 and armature of relay 303 back to the transmitter 304. Hybrid coils 113, 114 and 115 in Fig. 1, together with amplifiers 109 through 112, are used to combine the four signaling frequencies on leads 801 through 804 from the register and translator in Fig. 8, as described in the aforementioned copending application of D. F. Hoth-R. O. Soffel, Serial No. 56,186.

When the contacts H1—V1 close, a path is also established to operate the sleeve 1 relay 107 in Fig. 1 as follows: battery through the winding of hold magnet 402, through its contact 2 and armature, through contact 5 and armature of H1—V1, over lead 126 to Fig. 1, through the winding of relay 107, and through the armature and contact 1 of the trunk jack 102 to ground, allowing relay 107 to operate. The operation of relay 107 connects ground from its contact 1 and armature to supervisory lamp 103, causing it to light. This lamp indicates to the operator that the connection has been established to the idle channel and signaling tones transmitted, and that the mobile subscriber has not yet answered.

Relay 107 in Fig. 1 has a winding of comparatively low resistance and when it is connected in parallel with the winding of the test channel relay 501 in Fig. 5 over the path previously described, relay 501 releases. The release of relay 501 connects ground from its armature and contact 5, through contact 1 and armature of relay 502, over lead 218 to Fig. 2, through the armature and contact 2 of relay 202, over lead 120 to Fig. 1, and through the winding of relay 108 to battery, causing the latter relay to operate. When relay 108 operates it locks itself through its contact 1 and armature to ground through the armature and contact 1 of the trunk jack 102. The operation of relay 108 opens the path to the trunk start 1 relay 202, causing it to release. The release of relay 202 removes ground from its contact 1 over leads 209 and 210 thereby releasing magnet 401 in Fig. 4 and relay 204 in Fig. 2.

The release of relay 204 just mentioned connects ground from its armature and contact 3, over lead 213 to Fig. 5, and through the winding of the operate hold magnet relay 502 to battery, causing the latter to operate, which is its normal condition.

The release of relay 204 also causes the operation of the idle channel auxiliary 2 relay 517 in Fig. 5 over the following path: ground from the armature and contact 6 of relay 204, over lead 214 to Fig. 5, through the armature and contact 2 of relay 501, through the armature and contact 2 of relays 506, 517 and 529, through the armature and contact 3 of the operated relay 507, through the armature and contact 1 of the unoperated relay 518, over lead 522 to Fig. 4, through the armature and contact 4 of the unoperated hold magnet 405, over lead 523 to Fig. 5, through the armature and contact 1 of the mobile start relay 516, and through the winding of relay 517 to battery, causing the latter to operate. When relay 517 operates it locks itself through its contact 3 and armature, through contact 2 of relay 506, through contact 2 and armature of relay 501, over lead 214 to Fig. 2, and through contact 6 and armature of relay 204 to ground. The operation of relay 517 connects ground from its armature and contact 4 through the upper winding of the idle channel 2 relay 518 to battery, causing it to operate. The operation of relay 518 opens the locking circuit for relay 507 which had been previously established as follows: ground through the armature and contact 9 of the unoperated relay 521, through the armature and contact 10 of the then unoperated relay 518, through the armature and contact 9 of the then operated relay 507, through contact 5 and armature of the unoperated relay 508, through the armature and contact 7 of relay 507, and through its lower winding to battery. The release of relay 507 closes a locking path for relay 518 as follows: ground through the armature and contact 9 of relay 521, through the armature and contact 9 of the operated relay 518, through the armature and contact 8 of the unoperated relay 507, through the contact 5 and armature of relay 508, through the armature and contact 7 of relay 518, and through its lower winding to battery.

The operation of the idle channel 2 relay 518 closes a path to operate the idle tone relay 302 for channel 2 as follows: ground from the armature and contact 3 of the unoperated relay 501, through the armature and contact 6 of relay 518, through contact 1 and armature of relay 517 and over lead 309' of the corresponding Fig. 3 for channel 2, causing the idle tone relay 302 for that channel to operate and connect the idle tone oscillator to the transmitter for channel 2, as previously described for channel 1.

*Response at called mobile station, channel 1*

In the desired mobile station, the circuits operate in the following manner. Referring to Fig. 9, when idle tone is removed by the base station, the idle tone relay 903 releases, opening the path from ground through its armature and contact 1 to the coil of the control relay 904 and thence to battery, causing the control relay to release. Release of the control relay 904 opens the path from ground through its contact 1 and armature to the coil of the hunting control relay 905 and thence to battery. The hunting control relay is slow releasing and remains operated for a short period, so that the tuning motor 906 does not start, but waits for the signaling tones. When the four signaling tones are transmitted by the base station, they are received by the mobile receiver 901 and transmitted to the selector 915. The selector operates in the manner described in the copending application of D. F. Hoth-R. O. Soffel, Serial No. 56,186, operating the selector relay 916. Operation of the selector relay closes a path from ground through its armature and contact 1 to the bell 925 and thence to battery, causing the bell to ring. A path is also established from ground through contact 2 of the operated selector relay 916 and its armature to the coil of the control relay 904 and thence to battery, causing the control relay to operate. The hunting control relay 905, since it is slow releasing, has not yet released. A path from ground through contact 1 and the armature of the operated control relay 904 to the coil of the hunting control relay 905 and thence to battery causes the hunting control relay to remain operated, holding open the path from ground through the armature and contact 1 of the hunting control relay to the motor 906 and thence to battery. Thus the motor remains stopped.

When the subscriber answers he removes his handset 917 from the switchhook 918, operating the switchhook contacts. A path is established from ground through contact 2 and the armature of the operated control relay 904, through the armature and contact 1 of the operated switchhook 918 and thence to the transmitter control circuit 920, causing the transmitter control circuit to activate the mobile transmitter 919, which radiates carrier. The transmitter tuning switch 907 is arranged to rotate in synchronism with the receiver tuning switch 908 and connects crystals 921—924 corresponding to the various channels to the mobile transmitter, thus tuning the mobile transmitter to the proper channel. When the mobile transmitter is activated in the present case, crystal 924 is connected to the mobile transmitter and thus the transmitter radiates on channel 1. The telephone receiver 926 of the handset 917 is connected to the mobile receiver by a path through the armature and contact 3 of the operated switchhook, through the armature and contact 3 of the operated control relay 904, to the mobile receiver 901 and back to the telephone receiver. The mobile set is now in the talking condition. When the signaling tones are subsequently removed at the base station, the selector relay 916 releases, opening the path from ground through its contact 2 and armature to the coil of the control relay 904 to battery. However, the control relay remains operated by a path from ground through contact 2 and the armature of the operated switchhook 918, through the armature and contact 4 of the control relay 904, to the coil of the control relay and thence to battery. Release of the selector relay 916 opens the path from ground through its armature and contact 1 to the bell 925 and thence to battery, causing the bell to stop ringing.

*Response at other mobile stations*

The operation of each of the other (non-called) mobile units when idle tone is removed at the base station will now be described. When idle tone is removed from channel 1, it is transmitted on channel 2 as described previously. Removal of the idle tone from channel 1 allows the operated idle tone relay 903 in all idle mobile stations to release. The path from ground through its armature and contact 1 to the coil of the operated control relay 904 and thence to battery is opened, allowing relay 904 to release. When signaling tones for the wanted station are transmitted on channel 1 by the base station, the selector 915 in each of the other mobile units remains unoperated and the selector relay 916 is therefore unoperated. Thus the control relay 904 does not reoperate when the signaling tones are received. Release of the control relay 904 opens the path from ground through contact 1 and the armature of the control relay to the coil of the slow releasing hunting control relay 905 and thence to battery, allowing the hunting control relay to release after an interval (this interval being provided for a called station to recognize the signaling tones, as previously explained). A path is established from ground through the armature and contact 1 of the hunting control relay to the motor 906 and thence to battery, causing the motor to run. The motor drives switches 907 and 908 slowly in a clockwise direction, and after an interval switch 908 connects crystal 911 in place of crystal 912 to the mobile receiver 901. Thus channel 2 is received in place of channel 1. Since idle tone is now being transmitted by the base station on channel 2, it is received by the mobile receiver 901. This causes operation of the idle tone relay 903 as previously described. A path is established from ground through its armature and contact 1 to the coil of the control relay 904 and thence to battery. The control relay again operates, establishing a path from ground through its contact 1 and armature to the coil of the hunting control relay 905 and thence to battery, operating this relay. The path from ground through the armature and contact 1 of relay 905 to the motor and thence to battery is opened and the motor stops. The mobile station remains tuned to channel 2.

When idle tone is removed at the base station, the release of relays 903 and 904 is not instantaneous, a finite time being required therefor. If, during this short interval, the operator at one of the non-called stations should lift his handset 918 to initiate a call, his transmitter control 920 would be energized through contact 1 of the handset and contact 2 of the not yet released relay 904, which would thereupon become locked through its contact 4 and contact 2 of the handset. This station's transmitter would then be operating on channel 1 at the same time that the base station is transmitting on this channel. It is for the purpose of avoiding such a double connection that the previously mentioned "test interval" is provided at the base station, this being a brief delay between the removal of idle tone and the application of the signaling tones, effected by the slow release of relay 502. Circuits are provided at the base station, described hereinafter, which will divert the operator's call to the next idle channel and give the incoming call right of way over the vacated channel. This is one of the important features of the invention.

The test interval, as stated before, is made long enough to include also the time required at the base station for the response of the carrier operated device 306 and relay 307, and subsequent relays, to the reception of the mobile station's carrier.

*Response at base station to answering mobile station*

When the carrier is received from the answering mobile station by the receiver 305 in Fig. 3, it causes its carrier operated device 306 to connect ground through the winding of the sleeve relay 307 to battery, causing the latter to operate. The operation of relay 307 connects ground from its armature and contact 2 through the winding of the talk relay 303 to battery, causing the latter to operate. The operation of relay 303 disconnects the signaling tones from the transmitter 304 and connects the latter to hybrid coil 308, through contacts 2 and 3 and associated armatures. Hybrid coil 308 is connected over leads 310 and 311 through contacts 1 and 2, respectively, and their associated armatures, of the contact group H1—V1, over leads 122 and 123, respectively, to Fig. 1 and to jack 102, thus establishing the talking connection. When relay 307 operates it connects ground from its armature and contact 1 over lead 314, through H1—V1, and contact 5 of the contact group H1—V1, and over lead 126 to Fig. 1 to the winding of relay 107, short-circuiting this relay and causing it to release. The release of relay 107 extinguishes lamp 103, indicating to the operator that the called subscriber has answered. The operator now releases the dial key 104 in Fig. 1, causing the associated register and translator circuit to be restored to normal.

*Mobile originating call on channel 2*

A mobile originating call will now be described in detail. The station making the call is tuned to channel 2 and is receiving idle tone on that channel from the base station, as previously described, channel 1 being busy. Referring to Fig. 9, the idle tone relay 903, the control relay 904, and the hunting control relay 905 are operated and the selector relay 916 is unoperated. The motor 906 is stopped. When the subscriber originates the call he removes his handset 917 from the switchhook 918, operating the switchhook contacts. A path is established from ground through contact 2 and the armature of the operated control relay 904, through the armature and contact 1 of the operated switchhook 918, and to the transmitter control circuit 920, causing the mobile transmitter 919 to be activated and radiate carrier on channel 2.

The telephone receiver 926 of the handset 917 is connected to the mobile receiver 901 through a path from the mobile receiver through contact 3 and the armature of the operated control relay 904, through contact 3 and the armature of the operated switchhook 918, thence to the telephone receiver, and back to the mobile receiver. The mobile set is now in the talking condition. When idle tone is subsequently removed from channel 2 at the base station, the idle tone relay 903 releases, opening the path from ground through its armature and contact 1 to the coil of the control relay 904 and thence to battery. The control relay remains operated, however, through a path from ground through contact 2 and the armature of the operated switchhook 918, through the armature and contact 4 of the control relay to the coil of the control relay, and thence to battery. This holds relay 905 operated, and thus holds the motor stopped.

When the carrier from the mobile station is received by the base station receiver for channel 2, which is now the channel carrying idle tone, it enables its carrier operated device 306 to operate the sleeve relay 307. (It will be understood that Fig. 3 now represents base station apparatus for channel 2.) The operation of relay 307 connects ground from its armature and contact 2 through the winding of talk relay 303 to battery, causing it to operate. The operation of relay 303 removes the idle tone oscillator from the transmitter by opening contacts 1 and 4 of relay 303 from their respective armatures. Ground from the armature and contact 1 of relay 307 is connected over the lead 314' for channel 2 to Fig. 4, through the armature and contact 1 of No. 2 hold magnet 405, along conductor 538, and through the winding of the mobile start 2 relay 516 to battery, causing it to operate. When relay 516 operates, ground from its armature and contact 6 is connected over lead 211 to Fig. 2, through contact 1 and armature of the unoperated relay 204, through the winding of the start mobile relay 203, through its armature and contact 6, through the armature and contact 5 of relay 202, through the armature and contact 5 of relay 206, and through the armature and contact 4 of relay 208 to battery, causing the start mobile relay 203 to operate. When relay 203 operates, direct connection to battery is substituted for the connection through the above-mentioned contacts of the trunk start relays 202, 206 and 208 by means of a make-before-break spring combination including contacts 5 and 6 and their associated armature of relay 203. Relay 203 locks itself through its contact 1 and armature, over lead 211 to Fig. 5, and through contact 6 and armature of relay 516 to ground. The operation of relay 203 connects ground through its contact 4, through the armature and contact 2 of the operated busy 1 relay 201, through the armature and contact 3 of the busy 2 relay 205, and through the upper winding of the trunk start 2 relay 206 to battery, causing the latter relay to operate. Locking ground is furnished to relay 206 from armature and contact 3 of relay 203, through armature and contact 4 of relay 206, and through its winding to battery.

The operation of relay 206 connects ground from its armature and contact 1 over lead 219 to Fig. 4, through the winding of No. 2 select magnet 403 to battery, causing it to operate and continue its operating ground through its armature and contact 1 over lead 210 to Fig. 2 and through the winding of select-magnet-operated relay 204 to battery, thus causing this relay to operate. The operation of relay 204 closes a path from ground through the armature and contact 7 of the operated relay 203, through the armature and contact 4 of relay 204, over lead 217 to Fig. 5, through the armature and contact 3 of the released relay 519, through the armature and contact 4 of the mobile start 2 relay 516, over lead 523A to Fig. 4, and through the winding of No. 2 hold magnet 405 to battery, causing it to operate and close contact group H2—V2. When magnet 405 operates, ground is connected from the armature and contact 1 of relay 307 in Fig. 3, over the lead 314' for channel 2, and through the armature and contact 2 of magnet 405 to the winding to lock it operated. The operation of magnet 405 removes ground from its contact 1, causing the release of relay 516. The release of relay 516 removes ground from its contact 6, allowing start mobile relay 203 to release. The release of relay 203 removes ground from its contact 4 which opens the locking circuit of relay 206, allowing it to release.

When relay 204 in Fig. 2 operates as previously described, it removes ground from its contact 6 over lead 214, thus opening a locking circuit for the idle channel auxiliary 2 relay 517 in Fig. 5, allowing it to release. When the trunk start 2 relay 206 releases, it removes ground from its contact 1 over leads 219 and 210 thereby allowing No. 2 select magnet 403 in Fig. 4 and the select magnet operated relay 204 in Fig. 2 to release. The release of relay 204 connects ground from its armature and contact 6 to lead 214 to Fig. 5, through the armature and contact 2 of relay 501, through the armature and contact 2 of relays 506, 517 and 520, through the armature and contact 3 of the operated idle channel 2 relay 518, through the armature and contact 1 of the idle channel 3 relay 521, over lead 524 to Fig. 4, through the armature and contact 4 of the No. 3 hold magnet 406, along conductor 525, through the armature and contact 1 of the mobile start 3 relay 519, and through the winding of idle channel auxiliary 3 relay 520 to battery, causing the latter relay to operate. Relay 520 is locked operated through its armature and contact 3, through contact 2 and armature of relays 517 and 506, through contact 2 and armature of relay 501, over lead 214 to Fig. 2, and through contact 6 and armature of relay 204 to ground.

When relay 520 operates, ground is connected from its armature and contact 4 through the upper winding of idle channel 3 relay 521 to battery, causing it to operate. In operating, relay 521 opens the locking path for the idle channel 2 relay 518 and provides a locking path for itself as follows: ground on the armature and contact 3 of relay 521, through the armature and contact 8 of released relay 518, through the armature and contact 8 of relay 507, through contact 5 and armature of relay 508, through the armature and contact 7 of relay 521, and through its lower winding to battery. The operation of relay 521 closes a circuit from ground through the armature and contact 3 of the released relay 501 in Fig. 5, through the armature and contact 6 of relay 521, through the contact 1 and armature of relay 520, over lead 309" to Fig. 3 for channel 3, and through the winding of the idle tone relay 302 to battery, causing it to operate and connect the idle tone oscillator 301 to the transmitter 304 for channel 3 as previously described for the other channels, thus making channel 3 the designated idle channel. All idle mobile stations now move to channel 3 in the manner previously described.

When the contact group H2—V2 closes, ground from the armature and contact 1 of the operated relay 307 in its associated Fig. 3 is connected over the lead 314' for channel 2 to Fig. 4, through the contact 5 and armature of contact group H2—V2, over the lead 126' for trunk 2 to its associated Fig. 1, through the winding of the sleeve 1 relay 107, over the lead 118' for trunk 2 to Fig. 2, and through the winding of the busy 2 relay 205 to battery, causing both relays 107 and 205 to operate and the busy lamp 106 for channel 2 to be lighted, as previously described for channel 1. Ground through the winding of relay 107 in Fig. 1 for trunk 2 also is connected through the armature and normally made contact 2 of jack 102 to call lamp 101, causing it to light. The operation of relay 107 connects ground from its contact 1 and armature to light the supervisory lamp 103.

In order to acknowledge the call, the operator inserts the plug of the cord circuit into jack 102 for trunk 2. This causes ground from the contact 1 and armature of jack 102 to be connected to the lead 118' for channel 2, which holds the busy 2 relay 205 in Fig. 2 operated and short-circuits the winding of the sleeve relay 107 in Fig. 1, causing it to release. The release of relay 107 extinguishes lamp 103. When the plug is inserted in jack 102, contact 2 of the jack is opened, extinguishing call lamp 101. When contact group H2—V2 in Fig. 4 is operated, a path is closed through its contacts 1 and 2 and their associated armatures to connect the transmission path from trunk jack 102 in Fig. 1 to the hybrid coil 308 in Fig. 3 for channel 2, as previously described for channel 1.

*Base station originates a call on channel 3, and a mobile call originates during test interval*

When the operator next desires to originate a call to a mobile station, channels 1 and 2 now being busy, she inserts the plug of her cord into the trunk jack 102 in Fig. 1 for trunk 3, since this is now the only idle trunk and is the one carrying idle tone, to which all idle mobile stations are tuned. The insertion of the plug in jack 102 causes ground to be connected from its contact 1 over lead 118" for trunk 3 and through the winding of the busy 3 relay 207 to battery, causing it to operate. The operation of this relay connects ground from its armature and contact 1 over lead 116" to Fig. 1 for trunk 3 and to the busy lamp 106, causing it to light. As previously described, the operator registers the number to be called in the register and translator circuit of Fig. 8. When the called number has been registered, ground is connected from contact 2 and armature of the unoperated relay 203 in Fig. 2, through the armature and contact 3 of relays 202 and 206, over the lead 702" to the Fig. 7 associated with trunk 3, through the contacts of the lock relays as previously described, back over lead 701 to Fig. 1, through contact 2 and armature of the unoperated release start relay 108, over the lead 119" for trunk 3 to Fig. 2, and through the lower winding of the trunk start 3 relay 208 to battery, causing it to operate.

The operation of relay 208 connects ground from its armature and contact 2 over lead 220 to Fig. 4 and through the winding of No. 3 select magnet 404 to battery, causing it to operate and to continue its operating ground through its contact 1 and armature over lead 210 to Fig. 2 and through the winding of the select magnet operated relay 204 to battery, causing it to operate. The operation of relay 204 removes ground from its contact 6, causing the release of the idle channel auxiliary 3 relay 520 in Fig. 5. The release of relay 520 releases the idle tone relay 302 in its associated Fig. 3, as previously described for other channels, in turn causing the removal of idle tone from its associated transmitter 304.

When the select magnet operated relay 204 in Fig. 2 operates, it connects ground from its armature and contact 5, through contact 8 and armature of the unoperated relay 203, over lead 215 to Fig. 5, through the winding of the test channel relay 501, through resistance 503, through the armature and contact 4 of relays 507 and 518, through the armature and contact 5 of the operated idle channel 3 relay 521, over lead 526 to Fig. 4 and, through the winding of the No. 3 hold magnet 406 to battery. Because of the series resistance 503 in Fig. 5, hold magnet 406 does not get sufficient current to allow it to operate, but relay 501 in Fig. 5, being more sensitive, operates on this current. The operation of relay 501 opens the locking circuit for the operate hold magnet relay 502. Relay 502, being slow to release, does not release immediately; this path is opened, its holding time being the previously defined "test interval."

If a mobile subscriber now originates a call on channel 3 before his receiver has recognized the absence of idle tone the circuits will operate in the following manner to give his call precedence over that of the base station operator and thus prevent a double connection. The base station receiver 305 in Fig. 3 for channel 3, on receiving the mobile carrier, causes its carrier operated device 306 to operate the sleeve relay 307. The operation of relay 307 operates the talk relay 303 as previously described, disconnecting the channel 3 transmitter 304 from the relay 302, through which idle tone or signaling tone is supplied, and connecting it to the hybrid coil 308 for speech. The operation of relay 307 also connects ground from its armature and contact 1 over lead 314'', through the armature and contact 1 of hold magnet 406 in Fig. 4, over lead 527 to Fig. 5, and through the winding of the mobile start 3 relay 519 to battery, causing it to operate. The operation of relay 519 establishes the following path: ground on the armature and contact 10 of the operated idle channel 3 relay 521, through contact 5 and armature of relay 519, over lead 216 to Fig. 2, through the armature and contact 9 of relay 203, through the armature and contact 2 of relay 204, over lead 212 to Fig. 5, and through the winding of the reorder relay 504 to battery, causing it to operate.

The operation of relay 504 reestablishes the locking circuit for relay 502 over the following path: ground from the armature and contact 1 of relay 504, through the contact 2 and armature of relay 502, and through the winding of relay 502 to battery. The operation of relay 504 connects ground from its armature and contact 2 through the armature and contact 2 of relays 506, 517 and 520, through the armature and contact 3 of relay 521, through the armature and contact 1 of relay 507, over lead 511 to Fig. 4, through the armature and contact 3 of hold magnet 402, over lead 513 to Fig. 5, through the armature and contact 1 of relay 518, over lead 522 to Fig. 4, through the armature and contact 3 of hold magnet 405, over lead 528 to Fig. 5, through the armature and contact 2 of relay 521, and through the upper winding of the all-channels-busy relay 508 to battery, causing it to operate. The operation of relay 508 opens the locking circuit for the idle channel 3 relay 521 through the armature and contact 5 of relay 508, allowing relay 521 to release.

The release of relay 521 provides a locking circuit for relay 508 as follows: ground from the armature and contact 9 of relay 521, through the armature and contact 10 of relays 518 and 507, through contact 4 and armature of relay 506, and through its lower winding to battery. The release of relay 521 removes the ground from its contact 10, which was part of the operating path for the reorder relay 504, allowing the latter to release. The release of relay 521 also opens the operating circuit for the test channel relay 501 through the armature and contact 5 of relay 521. The release of relay 504 removes the locking ground for relay 502 from contact 1 of relay 504. However, the release of relay 501 reestablishes a locking path for relay 502.

With all the idle channel relays 507, 518 and 521 released, a path is again established to operate the test channel relay 501 as follows: ground from the armature and contact 5 of relay 204 in Fig. 2, through contact 8 and armature of relay 203, over lead 215 to Fig. 5, through the winding of relay 501, through the resistance 503, through the armature and contact 4 of relays 507, 518 and 521, through the armature and contact 3 of the all-channels-busy relay 508, through contact 1 and armature of the all-channels-busy auxiliary relay 509, over lead 515 to Fig. 4, and through the winding of No. 4 hold magnet 407 to battery. As in previous cases, the marginal hold magnet 407 does not operate at this stage, but relay 501 does. The operation of relay 501 removes the locking path for the slow-releasing relay 502, and after an interval the latter releases. The release of relay 502 short-circuits resistance 503 through its armature and contact 3, permitting the current to increase sufficiently to allow hold magnet 407 in Fig. 4 to operate.

Since No. 3 select magnet 404 in Fig. 4 is operated at this time, the operation of hold magnet 407 causes contact group H3—V4 to be closed. Hold magnet 407 is then locked operated over the following path: ground from contact 1 and armature of the trunk jack 102 in the associated Fig. 1 for trunk 3, over lead 126'' to Fig. 4, through the armature and contact 5 of contact group H3—H4, through contact 1 and armature of hold magnet 407, and through its winding to battery. This locking ground is also connected over lead 515 to Fig. 5, through the armature and contact 1 of relay 509, through contact 3 and armature of relay 508, through contact 4 and armature of relays 521, 518 and 507, through the armature and contact 3 of relay 502, and to winding of relay 501, short-circuiting the latter relay and causing it to release.

The release of relay 501 connects ground from its armature and contact 5 through contact 1 and armature of relay 502, over lead 218 to Fig. 2, through the armature and contact 1 of the trunk start 3 relay 208, over lead 120'' for trunk 3 to its associated Fig. 1, and through the winding of the release start relay 108, causing it to operate and lock through its contact 1 and armature to ground on lead 118''. The operation of relay 108 in Fig. 1 opens the operating circuit for trunk start 3 relay 208 in Fig. 2, allowing it to release.

The release of the test channel relay 501 in Fig. 5 connects ground from its armature and contact 1 over lead 409 to Fig. 4, through the armature and contact 2 of hold magnet 407, over lead 410 to Fig. 5, through contact 1 and armature of the all-channels-busy relay 508, and through the winding of the all-channels-busy auxiliary relay 509 to battery, causing it to operate. The operation of relay 509 locks itself operated from ground on its armature and contact 2, through contact 1 and armature of relay 508, and through the winding of relay 509 to battery. The operation of relay 509 opens the operating path for hold magnet 407, but the latter remains locked operated as previously described.

The release of trunk start 3 relay 208 in Fig. 2 opens the operating path for No. 3 select magnet 404 in Fig. 4 and select magnet operated relay 204 in Fig. 2, permitting them to release. The release of relay 204 in Fig. 2 closes the following path: ground from the armature and contact 6 of the mobile start 3 relay 519 in Fig. 5, over lead 211 to Fig. 2, through contact 1 and armature of relay 204, through the winding of the start mobile relay 203, through its armature and contact 3, through the armature and contact 5 of relays 202 and 206, and through the armature and contact 4 of relay 208 to battery, causing relay 203 to operate and lock itself over its contact 5 under control of the mobile start 3 relay 519 in Fig. 5. The release of relay 204 in Fig. 2 reestablishes the operating path for relay 502 in Fig. 5 as follows: ground from the armature and contact 3 of relay 204, over lead 213 to Fig. 5, and through the winding of relay 502 to battery.

When the contact group H3—V4 in Fig. 4 is closed, an intermittent ground from contact 1 and armature of the interrupter 409 is connected through contact 4 and armature of contact group H3—V4 over lead 127″ for trunk 3 to the associated Fig. 1, causing the supervisory lamp 103 to flash in synchronism with the interrupter. The operator thereupon releases the dial key 104, causing the release of the register and translator, and withdraws the plug from trunk jack 102. Removal of the plug causes the ground on its contact 1 to be removed from its associated armature, which releases the busy 3 relay 207 in Fig. 2 and the No. 4 hold magnet 407 in Fig. 4. The release of hold magnet 407 releases contact group H3—V4. The release of busy 3 relay 207 extinguishes its associated busy lamp 106 in Fig. 1.

The release of relay 207 also closes the following path: ground from the armature and contact 4 of the start mobile relay 203 in Fig. 2, through the armature and contact 2 of relays 201, 205 and 207, and through the upper winding of trunk start 3 relay 208 to battery, causing the latter relay to operate and lock over the following path: ground on the armature and contact 3 of relay 203, through the armature and contact 3 of relay 208, and through its upper winding to battery. The operation of relay 208 operates No. 3 select magnet 404 in Fig. 4 and select magnet operated relay 204 in Fig. 2, as previously described. The operation of relay 204 closes the following path: ground from the armature and contact 7 of relay 203, through the armature and contact 4 of relay 204, over lead 217 to Fig. 5, through the armature and contact 4 of mobile start 3 relay 519, over lead 526 to Fig. 4, and through the winding of No. 3 hold magnet 406 to battery, causing it to operate. The operation of hold magnet 406 locks itself over the following path: ground from the armature and contact 1 of the sleeve relay 307 in the associated Fig. 3, over lead 314″ for channel 3, through the armature and contact 2 of hold magnet 406, and through its winding to battery. The operation of hold magnet 406 in Fig. 4 also releases mobile start 3 relay 519 in Fig. 5 by removing ground from contact 1 of hold magnet 406. Since No. 3 select magnet 404 in Fig. 4 is operated, the operation of hold magnet 406 operates the contact group H3—V3. The release of relay 519 in Fig. 5 removes ground from the locking circuit of the start mobile relay 203 in Fig. 2, allowing it to release.

The operation of contact group H3—V3 in Fig. 4 closes the following path: ground from the armature and contact 1 of the sleeve relay 307 in the associated Fig. 3, over lead 314″ for channel 3 to Fig. 4, through contact 5 and armature of contact group H3—V3, over lead 126″ for trunk 3 to the associated Fig. 1, through the winding of the sleeve 1 relay 107, and through the armature and contact 2 of trunk jack 102 to call lamp 101. Closure of this path causes relay 107 to operate and also causes call lamp 101 to light. Ground through the winding of relay 107 is also connected over lead 118″ for trunk 3 to Fig. 2 and through the winding of busy 3 relay 207 to battery, causing it to operate. The operation of relay 207 connects ground from its armature and contact 1 over lead 116″ for channel 3 to its associated Fig. 1 and to the busy lamp 106, causing it to light. The operation of relay 107 in Fig. 1 connects ground through its contact 1 and armature to the supervisory lamp 103, causing it to light.

When the call lamp 101 in Fig. 1 for trunk 3 lights, the operator again inserts the plug of her cord circuit into the associated trunk jack 102. This extinguishes the call lamp 101 by removing ground from contact 2 of jack 102. Ground on contact 1 and armature of jack 102 is now connected to lead 118″, thus short-circuiting the winding of relay 107, causing it to release and also providing a path over lead 118″ to Fig. 2 to hold the busy 3 relay 207 operated. The release of the sleeve 1 relay 107 in Fig. 1 extinguishes the supervisory lamp 103. As previously described for mobile originating calls, a talking path is now established from jack 102 in Fig. 1, through contact group H3—V3 in Fig. 4, and through hybrid coil 308 and talk relay 303 in Fig. 3 to the transmitter 304 and receiver 305 for channel 3. At this point connections have been established on all three channels and there is thus no idle channel.

*All channels busy, no idle tone*

Since idle tone is now not received at any of the idle mobile units, their idle tone relays release. Referring to Fig. 9, release of the idle tone relay 903 in an idle mobile unit opens the path from ground through its armature and contact 1 to the coil of the control relay 904 and thence to battery, causing the control relay to release. The path from ground through contact 1 and the armature of the control relay 904 to the coil of the hunting control relay 905 and thence to battery is open, causing the hunting control relay to release after an interval. A path is established from ground through the armature and contact 1 of the unoperated hunting control relay 905 to the motor 906 and thence to battery, causing the motor to run. The motor drives switches 907 and 908 slowly in a clockwise direction, causing the crystals 910, 909, etc., to be connected in turn and the mobile receiver 901 to be tuned to each channel in turn. Since no idle tone is being transmitted on any channel, the mobile station continues to hunt over the channels in turn.

If the mobile subscriber now attempts to call, he removes his handset 917 from the switchhook 918. The control relay 904 is unoperated. The path from ground through the contact 2 and armature of the control relay 904, through the armature and contact 1 of the operated switchhook 918, and to the transmitter control circuit 920 is open. Thus the transmitter control circuit does not activate the mobile radio transmitter 919 and carrier cannot be radiated. The telephone receiver 926 of the handset 917 is not connected to the mobile radio receiver because the path from the mobile receiver through the contact 3 and armature of the control relay 904, and through the contact 3 and armature of the operated switchhook 918 to the telephone receiver and back to the mobile receiver is open.

Restoration of idle tone

The procedure by which an idle channel is reestablished and idle tone restored when one of the connections is terminated will now be described. For the purpose of illustration it will be assumed that the operator breaks down the connection on channel 2 by removing the plug from jack 102 in Fig. 1 (this figure now representing channel 2). The removal of the plug from jack 102 removes the short-circuit from the sleeve 1 relay 107, allowing it to reoperate and connect ground from its contact 1 and armature to the supervisory lamp 103, the lighting of which indicates that the mobile subscriber has not yet disconnected.

When the mobile subscriber on channel 2 disconnects, he returns his handset 917 to the switchhook 918, releasing the switchhook contacts. This opens the path which operates the transmitter control circuit 920, causing it to release and turn off the mobile transmitter 919. The path from the telephone receiver 926 of the handset 917 to the mobile receiver is broken and the telephone receiver is disconnected from the mobile receiver. The path from ground through contact 2 and the armature of the switchhook 918, through the armature and contact 4 of the control relay 904, to the coil of the control relay and thence to battery is opened, causing the control relay to release. The path from ground through contact 1 and the armature of relay 904 to the coil of the hunting control relay 905 and thence to battery is opened. Since relay 905 is slow-releasing, it does not release immediately. Shortly thereafter idle tone is returned to channel 2 by the base station, as described in the following paragraph. This causes operation of the idle tone relay 903, closing a path from ground through its armature and contact 1 to the coil of the control relay 904 and thence to battery, operating the control relay. The path from ground through contact 1 and the armature of the control relay to the coil of the hunting control relay 905 and thence to battery is reestablished, and the hunting control relay remains operated. The mobile station remains tuned to channel 2.

When the mobile subscriber disconnects, the removal of his carrier disables the carrier operated device 306 in Fig. 3 for channel 2, permitting the associated sleeve relay 307 to release. The release of relay 307 removes ground from lead 314 to Fig. 4, releasing the sleeve relay 107 for channel 2 in the associated Fig. 1, the busy 2 relay 205 in Fig. 2, and No. 2 hold magnet 405 in Fig. 4. The release of the latter releases contact group H2—V2. The release of the busy 2 relay 205 extinguishes its associated busy lamp 106 in Fig. 1. The release of hold magnet 405 establishes the following path: battery through the winding of the idle channel auxiliary 2 relay 517, through contact 1 and armature of relay 516, over lead 523 to Fig. 4, through contact 4 and armature of hold magnet 405, over lead 522 to Fig. 5, through contact 1 and armature of idle channel 2 relay 518, over lead 513 to Fig. 4, through contact 3 and armature of hold magnet 402, over lead 511 to Fig. 5, through contact 1 and armature of the idle channel 1 relay 507, over lead 529 to Fig. 4, through contact 3 and armature of hold magnet 406, over lead 524 to Fig. 5, through contact 2 and armature of the all-channels-busy relay 508, through contact 2 and armature of relays 520, 517 and 506, through contact 2 and armature of the test channel relay 501, over lead 214 to Fig. 2, and through contact 6 and armature of relay 204 to ground, causing the idle channel auxiliary 2 relay 517 to operate. Operation of relay 517 connects ground from its armature and contact 4 through the upper winding of the idle channel 2 relay 518 to battery, causing it to operate and lock in a manner similar to that previously described for other idle channel relays.

The operation of relay 518 closes the following path: ground from the armature and contact 3 of relay 501, through the armature and contact 6 of relay 518, through contact 1 and armature of relay 517, over lead 309' for channel 2 to its associated Fig. 3, and through the winding of the idle tone relay 302 to battery, causing it to operate. The operation of relay 302 connects the idle tone oscillator 301 to transmitter 304 for channel 2, as previously described for other channels. The operation of relay 518 opens the locking circuit for the all-channels-busy relay 508, allowing it to release and in turn permitting the all-channels-busy auxiliary relay 509 to release.

The idle mobile units which continued to hunt during the period when idle tone was not being transmitted on any channel stop hunting when idle tone has been restored to channel 2 and their tuning switches have caused their receivers to be tuned to channel 2. The circuits in the mobile units perform the same operations as in the case previously described in which a mobile unit, which had been shut off, is put into operation.

Mobile call originates during test interval, no channels busy

The case will now be described in which an operator originates a call to a mobile station when no channels are busy, channel 1 is the channel carrying idle tone, and a call from another mobile station originates on channel 1 during the test interval. Under these circumstances the operator's call is routed to channel 2, idle tone is transferred to channel 3, and the calling mobile subscriber is given priority on channel 1, to avoid a double connection.

Since channel 1 is the designated idle channel, the following relays will be operated before the operator originates the call. In Fig. 3 the idle tone relay 302 will be operated and idle tone will be connected to transmitter 304 over the following path: from the idle tone oscillator 301, through contact 2 and armature of the idle tone relay 302, through contact 1 and armature of the talk relay 303, to the transmitter 304, and return through the armature and contact 4 of relay 303, through the armature and contact 3 of relay 302, and to the idle tone oscillator 301. In Fig. 5, the idle channel 1 relay 507, the idle channel auxiliary 1 relay 506, and the operate hold magnet relay 502 will be operated.

In order to originate a call, the operator inserts the plug of her cord into the trunk jack 102 for trunk 1. The insertion of the plug into jack 102 connects ground from contact 1 through its armature over lead 118 to Fig. 2, and through the winding of the busy 1 relay 201 to battery, causing it to operate. When relay 201 operates, ground on its contact 1 is connected through its armature over lead 116 to light the busy lamp 106 in trunk 1. The operator then registers the desired number as previously described. When the operator has completed dialing four digits the trunk start 1 relay 202 is operated over the following path: from battery through contact 4 and armature of the unoperated relay 208, through contact 5 and armature of the unoperated relay 206, through the lower winding of relay 202, over lead 119 to Fig. 1, through the armature and contact 2 of the unoperated release start relay 108, over lead 701 to Fig. 8 and then to Fig. 7, through the armature and top contact of the operated thousands lock relay 704, through the top contact and armature of the operated hundreds lock relay 705, over lead 703 to block 706 which contains similar lock relays for the tens and units digits, back over lead 702 and through Figs. 8 and 1 to Fig. 2, and through the armature and contact 2 of the unoperated start mobile relay 203 to ground.

The operation of relay 202 connects ground from its armature and contact 1 over lead 209 through Fig. 1 to Fig. 4, and through the winding of No. 1 select magnet 401 to battery, causing it to operate. The operation of the select magnet continues its operating ground through its contact 1 and armature over lead 210 to Fig. 2, and through the winding of the select-magnet-operated relay 204, causing the latter to operate. The operation of select magnet 401 prepares a mechanical path for operating one of the sets of contacts associated with this select magnet.

The operation of relay 204 releases the idle channel auxiliary 1 relay 506 in Fig. 5 which had been held over the following path: ground through the armature and contact 6 of relay 204, over lead 214 to Fig. 5, through the armature and contact 2 of relay 501, through the armature and contact 3 of relay 506, and through its winding to battery. The operation of relay 204 also operates relay 501 in Fig. 5 over the following path: ground from the armature and contact 5 of operated relay 204, through contact 8 and armature of the start mobile relay 203, over lead 215 to Fig. 5, through the winding of the test channel relay 501, through resistance 503, through the armature and contact 5 of the operated idle channel 1 relay 507, over lead 510 to Fig. 4, and through the winding of No. 1 hold magnet 402 to battery. The hold magnet is marginal so that it will not operate under this condition because resistance 503 limits the current. Relay 501, however, as before stated, is a sensitive relay and operates on this reduced current.

The release of the idle channel auxiliary relay 506 previously mentioned causes the release of the idle tone relay 302 in Fig. 3, which has been held over the following path: ground from the armature and contact 3 of relay 501, through the armature and contact 6 of relay 507, through contact 1 and armature of relay 506, and over lead 309 to the idle tone relay 302 in Fig. 3. The release of relay 302 opens the previously described path connecting the idle tone oscillator 301 to the transmitter 304.

When the test channel relay 501 in Fig. 5 operates, it opens the locking circuit for the operate hold magnet relay 502. Relay 502 is slow to release in order to provide the test interval previously described.

If now some mobile subscriber originates a call on channel 1 during the test interval, the base station receiver 305 in Fig. 3 will receive carrier before relay 502 in Fig. 5 has released. The receipt of carrier enables the carrier operated device 306 in Fig. 3 to respond and cause the operation of sleeve relay 307. The operation of relay 307 operates the talk relay 303 as previously described for a mobile originating call. When relay 307 operates, ground is connected from its armature and contact 1, over lead 314 to Fig. 4, through the armature and contact 1 of the partially energized but not operated hold magnet 402, over lead 514 to Fig. 5, and through the winding of mobile start 1 relay 505 to battery, causing it to operate. The operation of relay 505 closes a path from ground through the armature and contact 11 of the operated relay 507, through contact 4 and armature of relay 505, over lead 216 to Fig. 2, through the armature and contact 9 of relay 203, through the armature and contact 2 of relay 204, over lead 212 to Fig. 5, and through the winding of the reorder relay 504 to battery, causing it to operate.

The operation of relay 504 connects ground through its armature and contact 1, through contact 2 and armature of relay 502, and through its winding to battery, reestablishing the locking path previously opened by the operation of the test channel relay 501. The operation of relay 504 connects ground from its armature and contact 2, through the armature and contact 2 of relays 506, 517 and 520, through the armature and contact 3 of the operated relay 507, through the armature and contact 1 of the idle channel 2 relay 518, over lead 522 to Fig. 4, through the armature and contact 4 of hold magnet 405, over lead 523 to Fig. 5, through the armature and contact 1 of the unoperated mobile start 2 relay 516, and through the winding of idle channel auxiliary 2 relay 517 to batery, causing it to operate. When relay 517 operates it locks itself in a manner similar to that described previously for relay 506, and connects ground from its armature and contact 4 through the upper winding of the idle channel 2 relay 518 to battery, causing the latter relay to operate. The operation of relay 518 removes the locking path for relay 507 as previously described.

The release of relay 507 opens the operating path for the reorder relay 504, permitting it to release. Relay 507 in releasing opens its contact 5, thus opening the operating circuit for test channel relay 501, but this path is immediately reclosed through the operated contact 5 and armature of relay 518. With relay 501 operated and relay 504 released, the locking circuit for relay 502 is open, and after an interval (the aforementioned test interval) it releases.

The release of relay 502 closes a path from ground on the armature and contact 5 of operated relay 204 in Fig. 2, through contact 8 and armature of relay 203, over lead 215 to Fig. 5, through the winding of relay 501, through contact 3 and armature of relay 502 which short-circuits resistance 503, through the armature and contact 4 of the released relay 507, through the armature and contact 5 of relay 518, over lead 523A, and through the winding of No. 2 hold magnet 405 to battery, causing it to operate. Since No. 1 select magnet 401 had previously been operated, the operation of magnet 405 closes the contact group H1—V2. When contacts 3 and 4 of this group make with their associated armatures, paths are closed through the combining hybrid coil 115 in Fig. 1 to the transmitter 304 in Fig. 3 for channel 2, as previously described, to transmit the combination of four signaling tones over channel 2. Trunk 1 jack 102 will be connected to the hybrid coil 308 for channel 2.

When contact 5 of contact group H1—V2 closes, ground is connected from contact 1 and armature of jack 102 in Fig. 1, through the winding of relay 107, over lead 126 to Fig. 4, through the armature and contact 5 of contact group H1—V2, through contact 2 and armature of the operated magnet 405, over lead 523A to Fig. 5, through contact 5 and armature of operated relay 518, through contact 4 and armature of relay 507, and through the armature and contact 3 of relay 502 to short-circuit the winding of the test channel relay 501, causing it to release. The release of relay 501 connects ground from its armature and contact 5, through contact 1 and armature of relay 502, over lead 218 to Fig. 2, through the armature and contact 2 of the operated trunk start 1 relay 202, over lead 120 to Fig. 1, and through the winding of the release start relay 108 to battery, causing it to operate.

As previously described, relay 108 locks itself to ground from jack 102. The operation of relay 108 opens its contact 2, causing relay 202 in Fig. 2 to release. The release of relay 202 removes ground from lead 209 to Fig. 4, whereupon select magnet 401 and relay 204 release. The release of relay 204 connects ground through its armature and contact 6, over lead 214 to Fig. 5, through the armature and contact 2 of relay 501, through the armature and contact 2 of relays 506, 517 and 520, through the armature and contact 3 of relay 518, through the armature and contact 1 of relay 521, over lead 524 to Fig. 4, through the armature and contact 4 of magnet 406, over lead 525 to Fig. 5, through the armature and contact 1 of relay 519, and through the winding of idle channel auxiliary 3 relay 520 to battery, causing it to operate and lock in the same manner as for the other idle channel auxiliaries previously described.

The release of relay 204 closes a path from ground through the armature and contact 5 of mobile start relay 505 in Fig. 5, over lead 211 to Fig. 2, through contact 1 and armature of relay 204, through the winding of start mobile relay 203, through its armature and contact 6 through the armature and contact 5 of relays 202 and 206, and through the armature and contact 4 of relay 208 to battery, causing relay 203 to operate. Relay 203 in operating locks itself as previously described.

When relay 204 releases it connects ground from its armature and contact 3 over lead 213 to Fig. 5, and through the winding of the operate hold magnet relay 502 to battery causing it to operate. When the start mobile relay 203 in Fig. 2 operates, it connects ground from its armature and contact 4, through the armature and contact 2 of the operated busy 1 relay 201, through the armature and contact 5 of the busy 2 relay 205, and through the upper winding of the trunk start 2 relay 206 to battery, causing it to operate. When the idle channel auxliary 3 relay 520 of Fig. 5 operates as previously described, it connects ground from its armature and contact 4 through the upper winding of the idle channel 3 relay 521 to battery, causing it to operate. The operation of relay 521 opens the locking circuit for the idle channel 2 relay 518, and when the latter releases a locking circuit is established for relay 521 in a manner similar to that described for the operation of the idle channel 2 relay 518 and the release of idle channel 1 relay 507.

The operation of relay 521 connects ground from the armature and contact 3 of relay 501, through the armature and contact 6 of relay 521, through contact 1 and armature of relay 520, over lead 309″ to Fig. 3 associated with channel 3, and through the winding of the idle tone relay 302 to battery, causing it to operate. As previously described for other channels, the operation of relay 302 connects idle tone to transmitter 304 for channel 3, hence designating channel 3 as the idle channel.

The operation of trunk start 2 relay 206 in Fig. 2, previously described, connects ground from its armature and contact 1 over lead 219 to Fig. 4, and through the winding of No. 2 select magnet 403 to battery, causing it to operate and to continue its operating ground through its contact 1 and armature over lead 210 to Fig. 2, and through the winding of select magnet operated relay 204 to battery, causing the latter relay to operate. The operation of relay 204 closes a path from ground on the armature and contact 7 of the operated start mobile relay 203, through the armature and contact 4 of relay 204, over lead 217 to Fig. 5, through the armature and contact 3 of relays 519 and 516, through contact 3 and armature of the operated mobile start 1 relay 505, over lead 510 to Fig. 4, and through the winding of No. 1 hold magnet 402 to battery, causing it to operate.

Since No. 2 select magnet 403 is operated, the operation of hold magnet 402 closes contact group H2—VI in Fig. 4. As previously described for hold magnet 405 operation of magnet 402 closes a path to lock itself under control of the sleeve relay 307 in its associated Fig. 3. Operation of magnet 402 opens the path to the mobile start 1 relay 505 in Fig. 5, causing it to release. The release of relay 505 opens the circuit to the winding of the start mobile relay 203, causing it to release. The release of relay 203 releases trunk start 2 relay 206 which, as previously described, releases the select magnet 403 in Fig. 4 and select magnet operated relay 204 in Fig. 2. When contact group H2—VI in Fig. 4 closes, it closes a path from contact 1 of the sleeve relay 307 in its associated Fig. 3, over lead 314′, through contact 5 and armature of contact group H2—VI, over lead 126′ to the Fig. 1 associated with trunk 2, through the winding of the sleeve 1 relay 107, over lead 218′ to Fig. 2, and through the winding of the busy 2 relay 205 to battery, causing both relays to operate. The operation of these relays lights lamps 101, 103 and 106 for trunk 2, as previously described for mobile originating calls. Trunk 2 jack 102 will now be connected to the hybrid coil 308 for channel 1.

*Disconnection at end of call on channel 1*

Disconnection at the end of the call on channel 1 occurs as follows. Referring to Fig. 9, the mobile subscriber returns his handset 917 to the switchhook 918, releasing the switchhook contacts. The path from ground through contact 2 and the armature of the control relay 904 and through the armature and contact 1 of the switchhook 918 to the transmitter control circuit 920 is opened, causing the transmitter control circuit to release and turn off the mobile radio transmitter 919. The path from the output of the mobile radio receiver 901, through contact 3 and the armature of control relay 904, through contact 3 and the armature of the switchhook 918, to the telephone receiver 926 of the handset 917, and thence back to the mobile receiver is opened, disconnecting the telephone receiver from the mobile receiver. The path from ground through contact 2 and the armature of the switchhook 918, through the armature and contact 4 of the control relay 904, to the coil of the control relay and thence to battery is opened, releasing the control relay. The path from ground through contact 1 and the armature of the control relay to the coil of the hunting control relay 905 and thence to battery is opened, releasing the hunting control relay after an interval. A path is established from ground through the armature and contact 1 of the hunting control relay 905 to the motor 906 and thence to battery, causing the motor to drive switches 907 and 908. The crystals 912, 911 and 910 are connected in turn to the mobile receiver 901, thus tuning the receiver to channels 1, 2 and 3 in turn. When it is tuned to channel 3, idle tone is received from the base station, operating the idle tone relay 903 as previously described. The control relay 904 is operated, operating the hunting control relay 905, and the motor stops. The mobile station remains tuned to channel 3.

When the mobile carrier is removed it causes the release at the base station of the carrier operated device 306 in Fig. 3, in turn releasing sleeve relay 307. The release of relay 307 removes a shunt around the winding of relay 107, Fig. 1, allowing it to operate and relight the supervisory lamp 103. When lamp 103 lights, the operator withdraws the plug from jack 102, allowing the armature of the jack to be separated from the ground on contact 1. Removal of this ground permits the release of relays 107 and 108, the talk relay 303, the busy relay 201, and the No. 1 hold magnet 402. The release of the latter allows the contacts of contact group H1—V1 to open. The release of relay 201 removes ground from the busy lamp 106, extinguishing it.

It is to be understood that the invention has been shown and described with reference to a specific embodiment for the purpose of explaining the principles and features of operation, and that various modifications may be made without departing from the scope of the invention, which is to be limited only by the claims appended hereto.

What is claimed is:

1. In a multichannel communication system including a base station and a plurality of outlying stations, automatic channel selecting means comprising means at said base station for impressing a control tone on an idle one of said channels, tuning means at each of said outlying stations for continuously tuning said stations to each of said channels in succession, means responsive to the reception of said control tone for stopping the operation of said tuning means and thereby holding said stations in the standby condition tuned to the channel carrying said control tone, manually operated switching means at said base station and relay means responsive thereto for removing said control tone and substituting a combination of selective signaling tones on said channel for calling a desired outlying station, means responsive to the substitution of said signaling tones for transferring said control tone to the next successive idle channel, means at each of said outlying stations for effecting a delay between the removal of said control tone and the thereto responsive reoperation of said tuning means of sufficient duration for said signaling tones to be recognized by said called station, and means selectively responsive to said signaling tones for locking said tuning means and thereby holding said called station tuned to the first-mentioned idle channel after the aforesaid removal of said control tone.

2. In a multichannel communication system including a base station and a plurality of outgoing stations, means at said base station for impressing a control tone on an idle one of said channels, tuning means at each of said outlying stations for continuously tuning said stations to each of said channels in succession, means responsive to the reception of said control tone for stopping the operation of said tuning means and thereby holding said stations in the standby condition tuned to the channel carrying said control tone, manually operated switching means at said base station and relay means responsive thereto for removing said control tone from said idle channel and substituting a combination of selective signaling tones for calling a desired outlying station, means at each of said outlying stations for effecting a delay between the removal of said control tone and the thereto responsive reoperation of said tuning means of sufficient duration for said signaling tones to be recognized by said called station, means selectively responsive to said signaling tones for locking said tuning means at said called station and thereby holding said station tuned to said idle channel after the aforesaid removal of said control tone, means at said base station responsive to waves received in answer from said called station for removing said signaling tones and transferring said control tone to the next successive idle channel, and means at said called station in response to the answering of said signaling tones for holding said tuning means locked after the aforesaid removal of said signaling tones.

3. In a multichannel two-way communication system including a base station and a plurality of outlying stations, automatic channel selecting means comprising means at said base station for adding a control tone on an idle one of said channels, tuning means at each outlying station for continuously tuning same to each channel in succession, means responsive to the reception of said control tone for stopping the operation of said tuning means and thereby holding said outlying stations in the standby condition tuned to the channel carrying said control tone, manually operated switching means at said base station and relay means responsive thereto for removing from said idle channel said control tone and substituting a combination of selective signaling tones for calling a desired outlying station, said means including means for delaying said substitution after said removal for a period designated the test interval, said test interval being substantially equal to but not less than the time required for said outlying stations to recognize the said removal of idle tone plus the time required for said base station to recognize waves emitted by a calling outlying station before the lapse of the first-mentioned recognition time, and means at said base station responsive to waves emitted by said calling station during said test interval for diverting said base station's call to the next successive idle channel, thereby leaving said first mentioned idle channel to the use of said calling station, and for transferring said control tone to the idle channel next in succession to the last-mentioned idle channel, said last-mentioned means including means responsive to an incoming call during said test interval when there is no remaining idle channel for preventing the connection of said base station's call and for operating a signal indicating the said incoming call, and including means responsive to the abandonment of said first-named channel by the operator at said base station in recognition of said signal for connecting said incoming call to said abandoned channel.

DANIEL F. HOTH.
ROBERT O. SOFFEL.

References Cited in the file of this patent

UNITED STATES PATENTS

| Number | Name | Date |
|---|---|---|
| 1,572,756 | Smythe et al. | Feb. 9, 1920 |
| 2,479,701 | Ress | Aug. 23, 1949 |
| 2,512,613 | Devaux | June 27, 1950 |
| 2,545,642 | Bellairs et al. | Mar. 20, 1951 |